(12) United States Patent
Yang et al.

(10) Patent No.: US 12,468,090 B2
(45) Date of Patent: Nov. 11, 2025

(54) ULTRASOUND SENSING AND IMAGING BASED ON WHISPERING-GALLERY-MODE (WGM) MICRORESONATORS

(71) Applicant: Washington University, St. Louis, MO (US)

(72) Inventors: Lan Yang, St. Louis, MO (US); Guangming Zhao, St. Louis, MO (US); Xuefeng Jiang, St. Louis, MO (US); Yihang Li, St. Louis, MO (US)

(73) Assignee: Washington University, St. Louis, MO (US)

( * ) Notice: Subject to any disclaimer, the term of this patent is extended or adjusted under 35 U.S.C. 154(b) by 260 days.

(21) Appl. No.: 17/761,026

(22) PCT Filed: Sep. 18, 2020

(86) PCT No.: PCT/US2020/051596
§ 371 (c)(1),
(2) Date: Mar. 16, 2022

(87) PCT Pub. No.: WO2021/055823
PCT Pub. Date: Mar. 25, 2021

(65) Prior Publication Data
US 2022/0350082 A1    Nov. 3, 2022

Related U.S. Application Data

(60) Provisional application No. 62/901,883, filed on Sep. 18, 2019.

(51) Int. Cl.
G02B 6/293     (2006.01)
A61B 5/00      (2006.01)
A61B 8/00      (2006.01)
G01N 29/06     (2006.01)

(52) U.S. Cl.
CPC ........ *G02B 6/29341* (2013.01); *A61B 5/0095* (2013.01); *A61B 8/4444* (2013.01); *A61B 8/565* (2013.01); *G01N 29/0654* (2013.01); *A61B 2562/0238* (2013.01)

(58) Field of Classification Search
CPC .. A61B 5/0095; A61B 8/4444; G02B 6/29341
See application file for complete search history.

(56) References Cited

U.S. PATENT DOCUMENTS

| | | | |
|---|---|---|---|
| 2004/0218880 A1* | 11/2004 | Matsko | G02B 6/29341 385/122 |
| 2014/0360273 A1 | 12/2014 | Zhang et al. | |
| 2016/0266110 A1 | 9/2016 | Ozdemir et al. | |

OTHER PUBLICATIONS

Chistiakova et al., "Photoelastic ultrasound detection using ultra-high-Q silica optical resonators," Optics Express, 22(23): 28169-28179 (2014), doi.org/10.1364/OE.22.028169.

(Continued)

*Primary Examiner* — Amelie R Davis
(74) *Attorney, Agent, or Firm* — Armstrong Teasdale LLP

(57) ABSTRACT

Optical whispering gallery mode (WGM) resonator-based acoustic sensors, imaging systems that make use of the acoustic sensors, and methods of detecting ultrasound waves using the acoustic sensors are disclosed.

18 Claims, 26 Drawing Sheets

(56) References Cited

OTHER PUBLICATIONS

Maxwell et al., "Polymer Microring Resonators for High-Frequency Ultrasound Detection and Imaging," in IEEE Journal of Selected Topics in Quantum Electronics, 14(1): 191-197, (2008), doi: 10.1109/JSTQE.2007.914047.

Monifi et al., "Encapsulation of a Fiber Taper Coupled Microtoroid Resonator in a Polymer Matrix," in IEEE Photonics Technology Letters, 25(15): 1458-1461 (2013), doi: 10.1109/LPT.2013.2266573.

Monifi et al., "A Robust and Tunable Add-Drop Filter Using Whispering Gallery Mode Microtoroid Resonator," in Journal of Lightwave Technology, 30(21): 3306-3315 (2012), doi: 10.1109/JLT.2012.2214026.

Monifi et al., "Ultrasound sensing using a fiber coupled silica microtoroid resonator encapsulated in a polymer," 2013 IEEE Photonics Conference, pp. 215-216 (2013), doi: 10.1109/IPCon.2013.6656511.

International Search Report and Written Opinion issued for PCT/US2020/051596 dated Mar. 9, 2021 (14 pages).

Wei, Heming et al., "High-frequency ultrasonic sensor arrays based on optical micro-ring resonators," Health Monitoring of Structural Biological Systems XII, Proceedings of SPIE, vol. 10600: 1060003-1 to 1060003-8 (2018).

Extended European Search Report, issued for Application No. 20866269.2, dated Nov. 27, 2023 (9 pages).

Examination Report for EP Patent Application No. 20866269.2 dated May 2, 2025; 6 pp.

Written Opinion for SG Patent Application No. 11202202767T dated Jun. 25, 2025; 8 pp.

\* cited by examiner

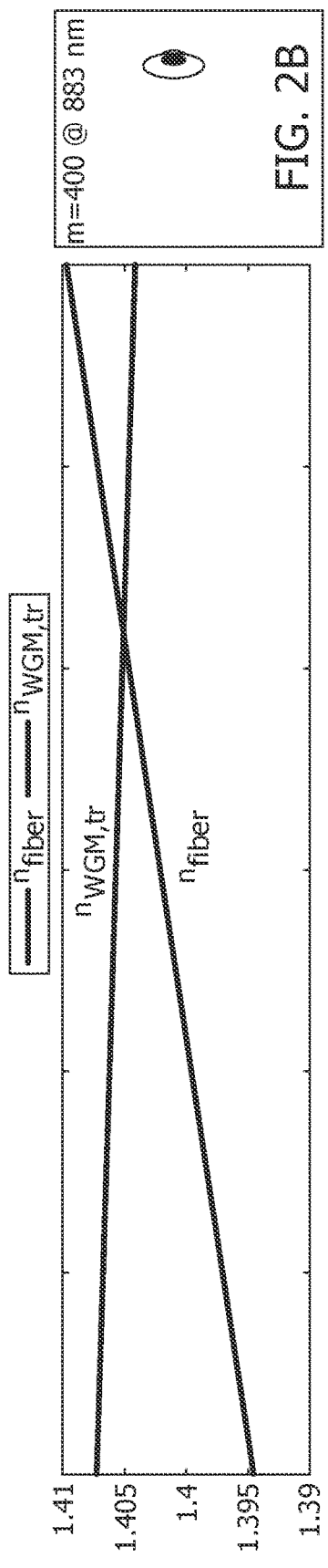
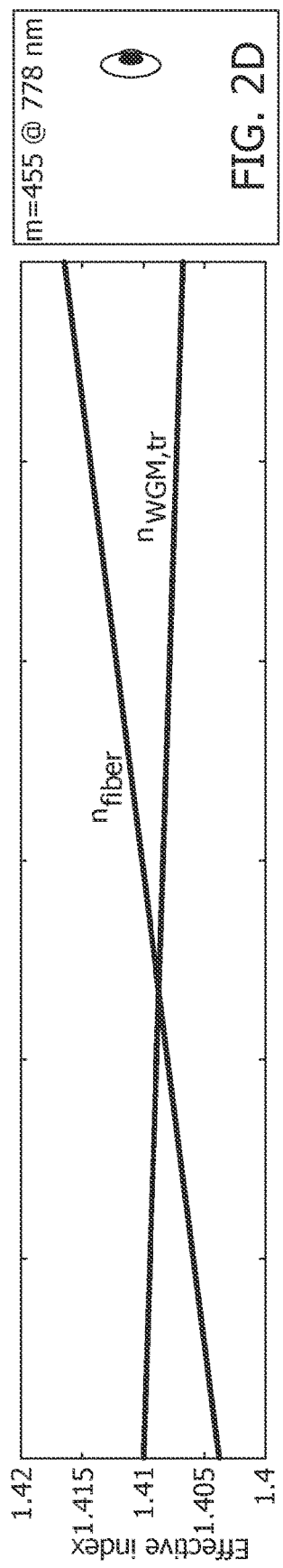
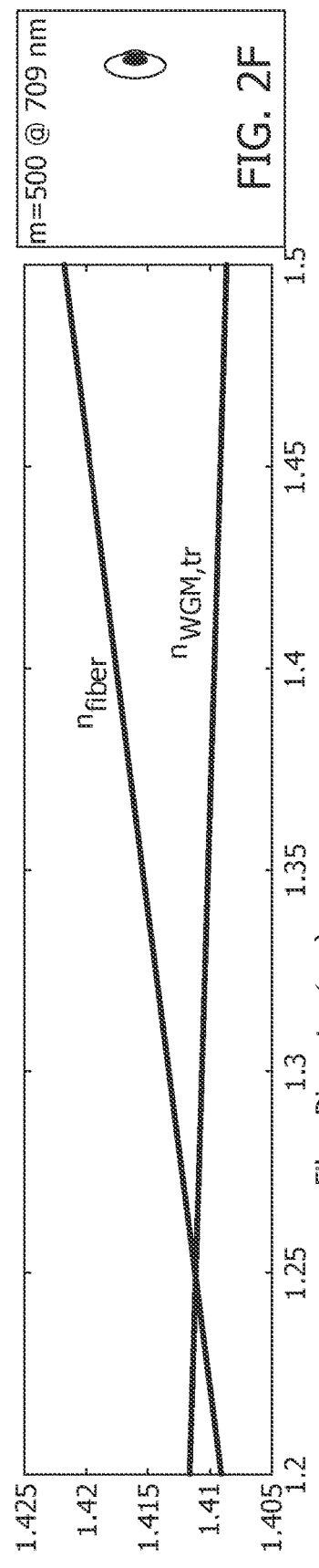

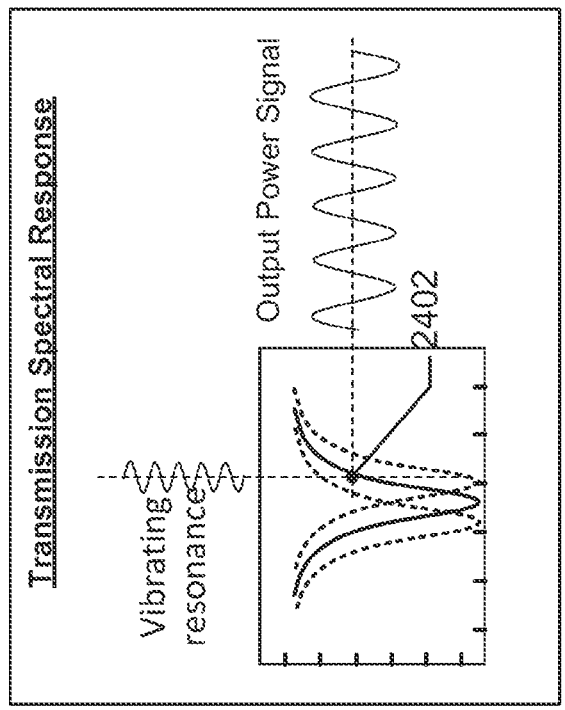
$$\lambda = \frac{2\pi n_{\text{eff}} R_{\text{eff}}}{m}$$
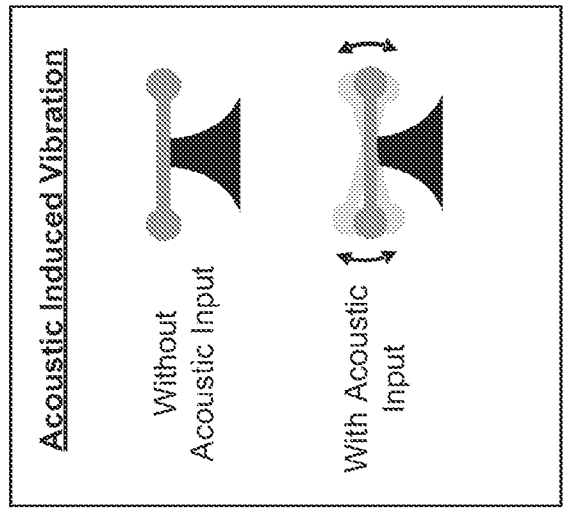
FIG. 24

ULTRASOUND SENSING AND IMAGING BASED ON WHISPERING-GALLERY-MODE (WGM) MICRORESONATORS

CROSS-REFERENCE TO RELATED APPLICATIONS

This application claims priority from U.S. Provisional Application Ser. No. 62/901,883 filed on Sep. 18, 2019, which is incorporated herein by reference in its entirety.

STATEMENT REGARDING FEDERALLY SPONSORED RESEARCH OR DEVELOPMENT

This invention was made with government support under W911NF1710189 and W911NF1210026 awarded by the Army Research Office. The government has certain rights in the invention.

FIELD OF THE DISCLOSURE

The present disclosure generally relates to systems and methods to perform ultrasound imaging using acoustic transducers that include whispering-gallery-mode resonators.

BACKGROUND OF THE DISCLOSURE

Ultrasound technology has attracted increasing interest in various fields, particularly in non-invasive measurements, remote sensing and biomedical imaging. Ultrasound imaging is used in a wide variety of settings to non-invasively image internal structures of patients by detecting ultrasound pulses reflected from tissue boundaries within the patient. Ultrasound detectors used in imaging applications typically have low noise equivalent pressure (NEP) and function at high frequencies with wide bandwidths. Currently available piezoelectric-based ultrasound detectors generally satisfy these requirements. However, for those imaging applications where detectors with smaller dimensions are needed, the use of piezoelectric-based ultrasound detectors is limited by noise in that a reduction in the dimensions of piezoelectric-based ultrasound detectors smaller are accompanied by an increase in the noise associated with ultrasound detection.

Further, as the resolution of ultrasound increases by applying higher frequency soundwaves, its depth of penetration decreases due to the increased acoustic attenuation. This tradeoff between resolution and penetration depth poses a challenge in the context of conventional, piezoelectric ultrasound sensors.

Photonic devices (e.g., gratings, etalons, etc.) and optical pressure detection techniques have shown great promise for ultrasound detection, and have gained increasing interest because these devices can be fabricated in micro-scales without sacrificing ultrasound detection performance or sensitivity. In photonic devices, refractive index modulation and/or shape deformations due to strain induced by an acoustic wave are translated into changes in the intensity of the detected light or the spectral properties of the device. In some existing devices, optical resonators have been used as highly sensitive ultrasound detectors. In these resonators, arrival of ultrasound wave leads to modulation of the resonant frequency or the transmitted light intensity. In general, the performance of an optical resonator is limited by its quality factor Q (i.e., the higher the Q, the lower the optical loss and the smaller the detectable resonance shift) as well as by the acousto-optical and mechanical properties of the material from which the resonator is made.

Other objects and features will be in part apparent and in part pointed out hereinafter.

BRIEF DESCRIPTION OF THE DISCLOSURE

In one aspect, an acoustic sensor is disclosed that includes an optical whispering gallery mode resonator, a coupling waveguide for optically coupling to the resonator, and a polymer encasing a portion of the coupling waveguide and the resonator. The coupling waveguide is spaced from the resonator by a separation gap. The resonator and the coupling waveguide each have higher refractive indices than the corresponding refractive index of the polymer.

In other aspects, an acoustic sensing system is disclosed that includes an optical whispering gallery mode resonator, a coupling waveguide for optically coupling to the resonator, a polymer encasing the resonator and a portion of the coupling waveguide, a light source coupled to the first end of the coupling waveguide projecting from the low-index polymer, and a light detector coupled to the second end of the coupling waveguide and projecting from the low-index polymer. The coupling waveguide has a first end and a second end opposite the first end, and is spaced from the resonator by a separation gap. The resonator and the coupling waveguide each have higher refractive indices than the corresponding refractive index of the polymer.

In additional aspects, a photoacoustic imaging device is disclosed that includes an acoustic sensor. The acoustic sensor includes an optical whispering gallery mode resonator, a coupling waveguide for optically coupling to the resonator, a polymer encasing the resonator and a portion of the coupling waveguide, a transducer light source coupled to the first end of the coupling waveguide projecting from the low-index polymer, a transducer light detector coupled to the second end of the coupling waveguide opposite to the first end and projecting from the low-index polymer, and a photoacoustic light source. The coupling waveguide has a first end and a second end opposite the first end, and the coupling waveguide is spaced from the resonator by a separation gap. The resonator and the coupling waveguide each have higher refractive indices than the corresponding refractive index of the polymer.

In other additional aspects, a method for detecting ultrasound waves is disclosed that includes providing an acoustic sensing system. The acoustic sensing system includes an optical whispering gallery mode resonator, a coupling waveguide for optically coupling to the resonator, a polymer encasing the resonator and a portion of the coupling waveguide, a light source, and a light detector. The coupling waveguide has a first end and a second end opposite the first end, and the coupling waveguide is spaced from the resonator by a separation gap. The light source is coupled to the first end of the coupling waveguide projecting from the low-index polymer, and the light detector couples to the second end of the coupling waveguide projecting from the low-index polymer. The polymer forms a sample contact surface. The resonator and the coupling waveguide each have higher refractive indices than the corresponding refractive index of the polymer. The method further includes acoustically coupling the sample contact surface with a sample such that ultrasound waves emitting from within the sample are conducted through the polymer to the resonator and the portion of the coupling waveguide, introducing light produced by the light source into the first end of the coupling waveguide, converting light from the second end of the coupling waveguide detected by the light detector into detector signals encoding the amplitude of the detected light, and transforming the detector signals into a pressure using a predetermined calibration rule.

Other objects and features will be in part apparent and in part pointed out hereinafter.

DESCRIPTION OF THE DRAWINGS

Those of skill in the art will understand that the drawings, described below, are for illustrative purposes only. The drawings are not intended to limit the scope of the present teachings in any way.

FIG. 2A is a graph summarizing the effective indices for light transmission at 883 nm within an optic fiber ($n_{fiber}$) and a microtoroid resonator ($m_{WGM,tr}$) encased in a polymer with a refractive index (n) of 1.33;

FIG. 2B is a map illustrating the fiber mode distribution for the optic fiber shown in FIG. 2A;

FIG. 2C is a graph summarizing the effective indices for light transmission at 778 nm within an optic fiber ($n_{fiber}$) and a microtoroid resonator ($m_{WGM,tr}$) encased in a polymer with a refractive index (n) of 1.33;

FIG. 2D is a map illustrating the fiber mode distribution for the optic fiber shown in FIG. 2C;

FIG. 2E is a graph summarizing the effective indices for light transmission at 709 nm within an optic fiber ($n_{fiber}$) and a microtoroid resonator ($m_{WGM,tr}$) encased in a polymer with a refractive index (n) of 1.33;

FIG. 2F is a map illustrating the fiber mode distribution for the optic fiber shown in FIG. 2E;

FIG. 24 is a schematic illustration of the detection of acoustic signals using a microtoroid pressure sensor in accordance with one aspect of the disclosure.

Figure 1B:
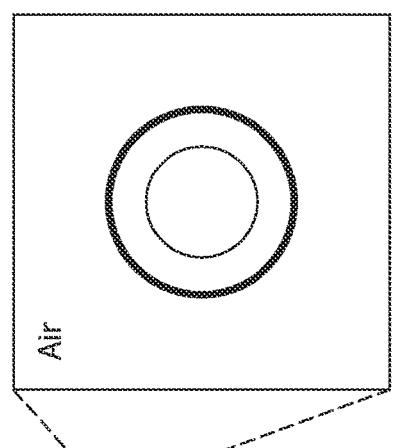
FIG. 1B is a map illustrating the fiber mode distribution for the 1.6-μm optic fiber shown in FIG. 1A.
Figure 1A:
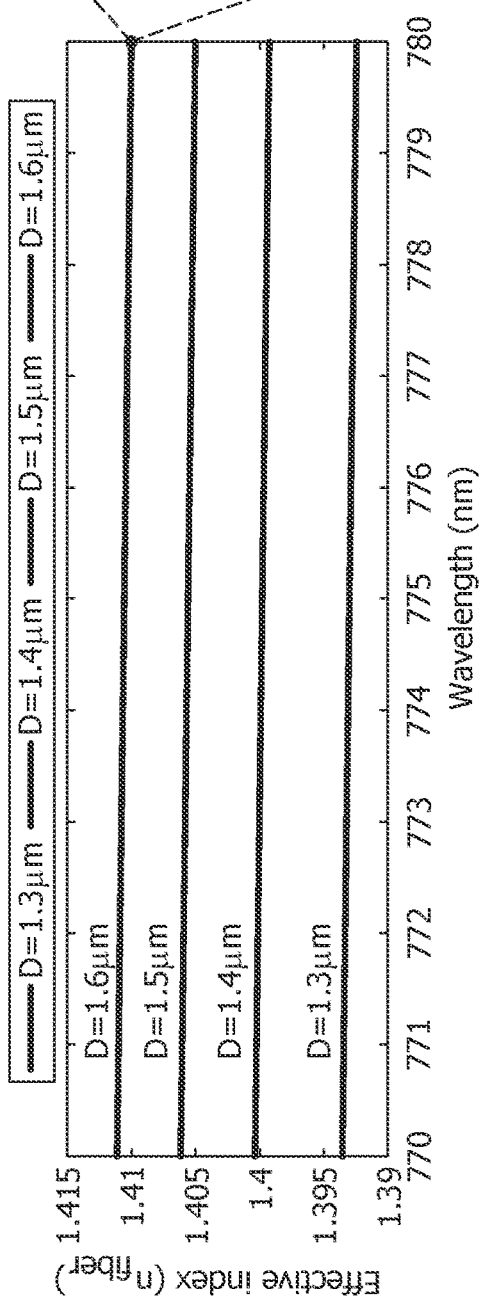
FIG. 1A is a graph summarizing fiber mode index as a function of wavelength for several different diameters of optic fiber in air.

There are shown in the drawings arrangements that are presently discussed, it being understood, however, that the present embodiments are not limited to the precise arrangements and are instrumentalities shown. While multiple embodiments are disclosed, still other embodiments of the present disclosure will become apparent to those skilled in the art from the following detailed description, which shows and describes illustrative aspects of the disclosure. As will be realized, the invention is capable of modifications in various aspects, all without departing from the spirit and scope of the present disclosure. Accordingly, the drawings and detailed description are to be regarded as illustrative in nature and not restrictive.

DETAILED DESCRIPTION OF THE INVENTION

In various aspects, a pressure sensor that includes an ultra-high quality optical whispering-gallery-mode (WGM) resonator encased in a low-index polymer is disclosed. In various other aspects, the polymer-encased whispering-gallery-mode (WGM) resonator may be included in a pressure detection system. In various additional aspects, a medical imaging system including, but not limited to, an ultrasound imaging system, may include the optical whispering-gallery-mode (WGM) resonator as an acoustic sensor. Compared to a conventional hydrophone based on piezoelectric materials, an optical resonator could leverage the circulating light's high sensitivity to the mechanical perturbations induced by the incoming acoustic waves, and thus achieve a higher sensitivity to the acoustic signal. Meanwhile, the sub-millimeter footprint achievable using WGM microresonators could (1) provide promise in forming compact sensor arrays; and (2) broaden the acoustic response bandwidth to higher frequency.

In various aspects, the polymer-encased WGM resonators possess both high optical quality factors ($Q\sim 10^7$) and rich mechanical modes reacting to incoming acoustic signals, as described in additional detail below. The polymer casing maintains a fiber taper and WGM resonator coupled in a fixed arrangement, enabling robust optical driving of the system free from mechanical perturbation. The polymer casing further simplifies the optical packaging process during manufacturing and the packaging simplifies the incorporation of the polymer-encased WGM resonators as pressure sensors into the design of a variety of devices including, but not limited to, ultrasound imaging systems.

Figure 3:
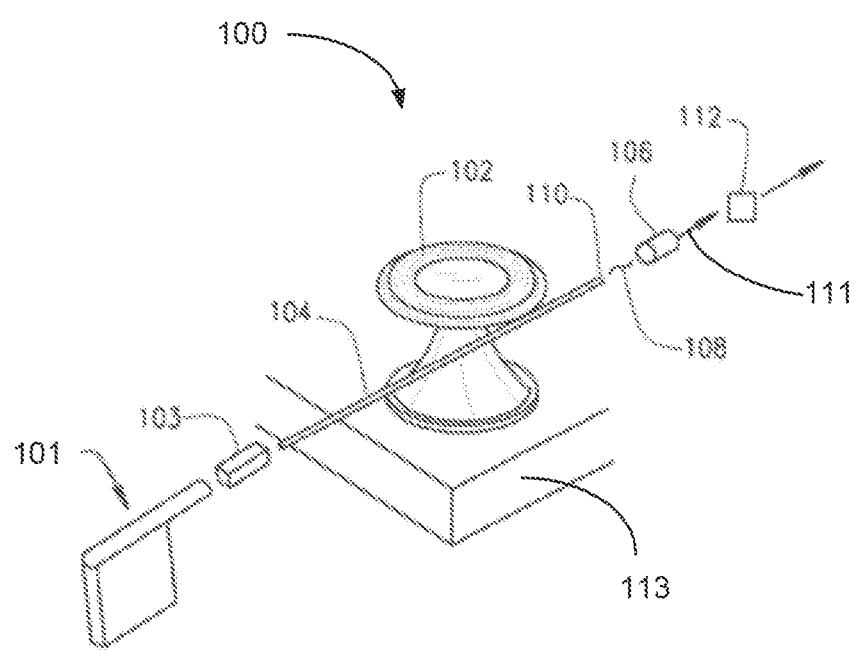
FIG. 3 is an image of a optical-resonator-based acoustic pressure sensor in accordance with one aspect of the disclosure.

I. Optical-Resonator-Based Acoustic Sensors, Sensor Systems, and Methods of Use The details of the invention and various embodiments can be better understood by referring to the figures of the drawing. Referring to FIG. 3, an illustration of an optical-resonator-based acoustic sensor system 100 is illustrated. In various aspects, the system 100 can include a light source 101 including, but not limited to a tunable laser. The system 100 further includes a WGM resonator 102 attached to a substrate 113, and a coupling waveguide 104 to bring the laser energy in and out of the resonance modes of the resonator 102. The system 100 may further include an optic coupler 103 configured to direct the laser energy produced by the light source 101 into the coupling waveguide 104. Non-limiting examples of suitable light sources include semiconductor lasers (DFB or FP laser diodes), (GaN or similar LED on-chip light sources, or on-chip WGM microlasers whose wavelength can be finely tuned by temperature control or by controlling the driving current. A photoreceiver 106 (or a photodetector) coupled to an opposite end of the coupling waveguide 104 can be used to detect the laser signal 108 at the output port 110 of the coupling waveguide 104.

In various aspects, both the light source 101 and the photoreceiver 106 are linked to a computing device 112 (not illustrated). In various aspects, the computing device is configured to control the operation of the light source 101 and to process the output from the photoreceiver 106 to extract information related to light transmission from the resonator 102. In another aspect, the computing device 112 of the system 100 furthers include a processor and a non-volatile computer-readable memory (not illustrated), as described in additional detail below.

Figure 4A:
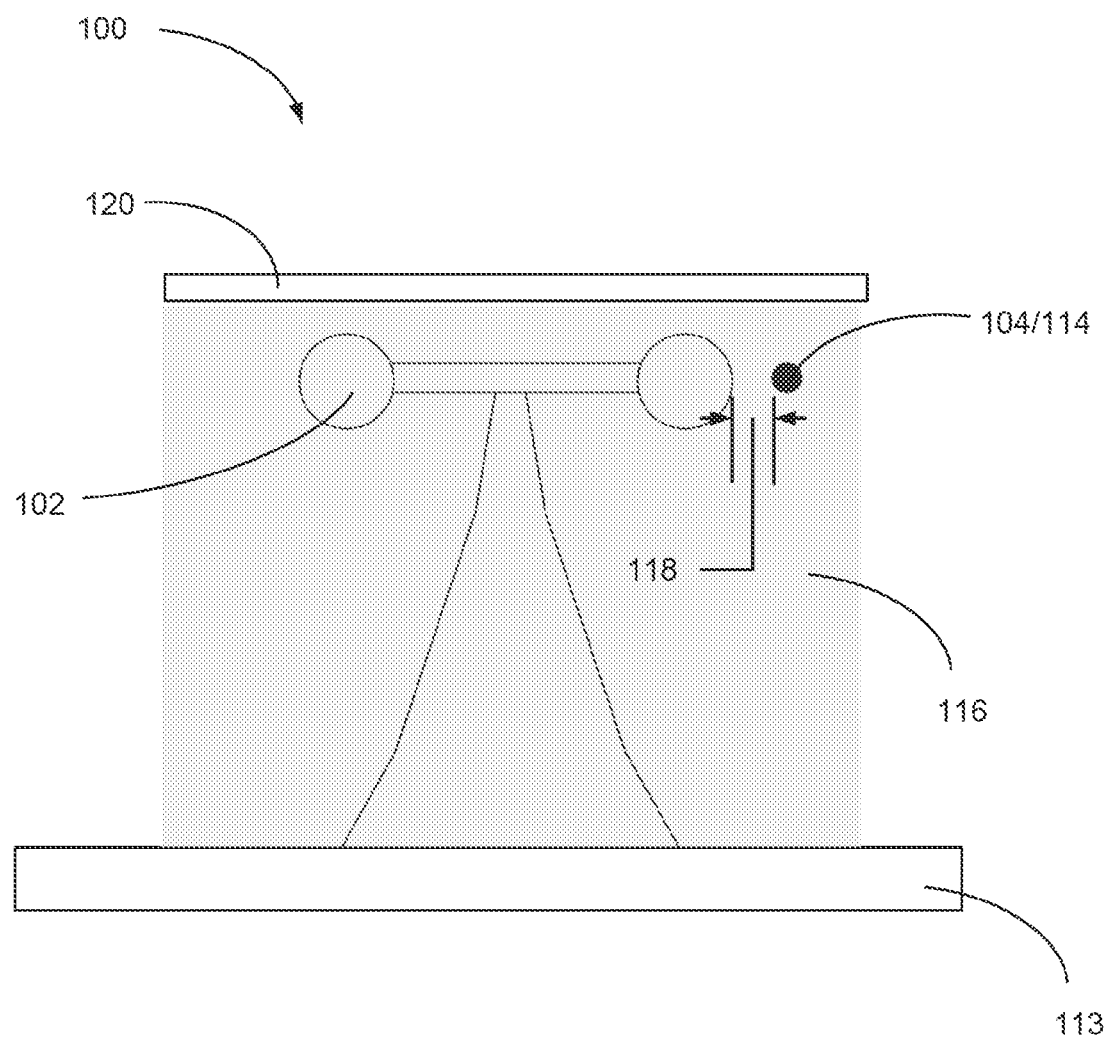
FIG. 4A is a cross-sectional schematic view of the optical-resonator-based acoustic sensor as shown in FIG. 3, in which the optical-resonator-based acoustic pressure sensor is embedded within a casement formed from a low-index polymer material.
Figure 4B:
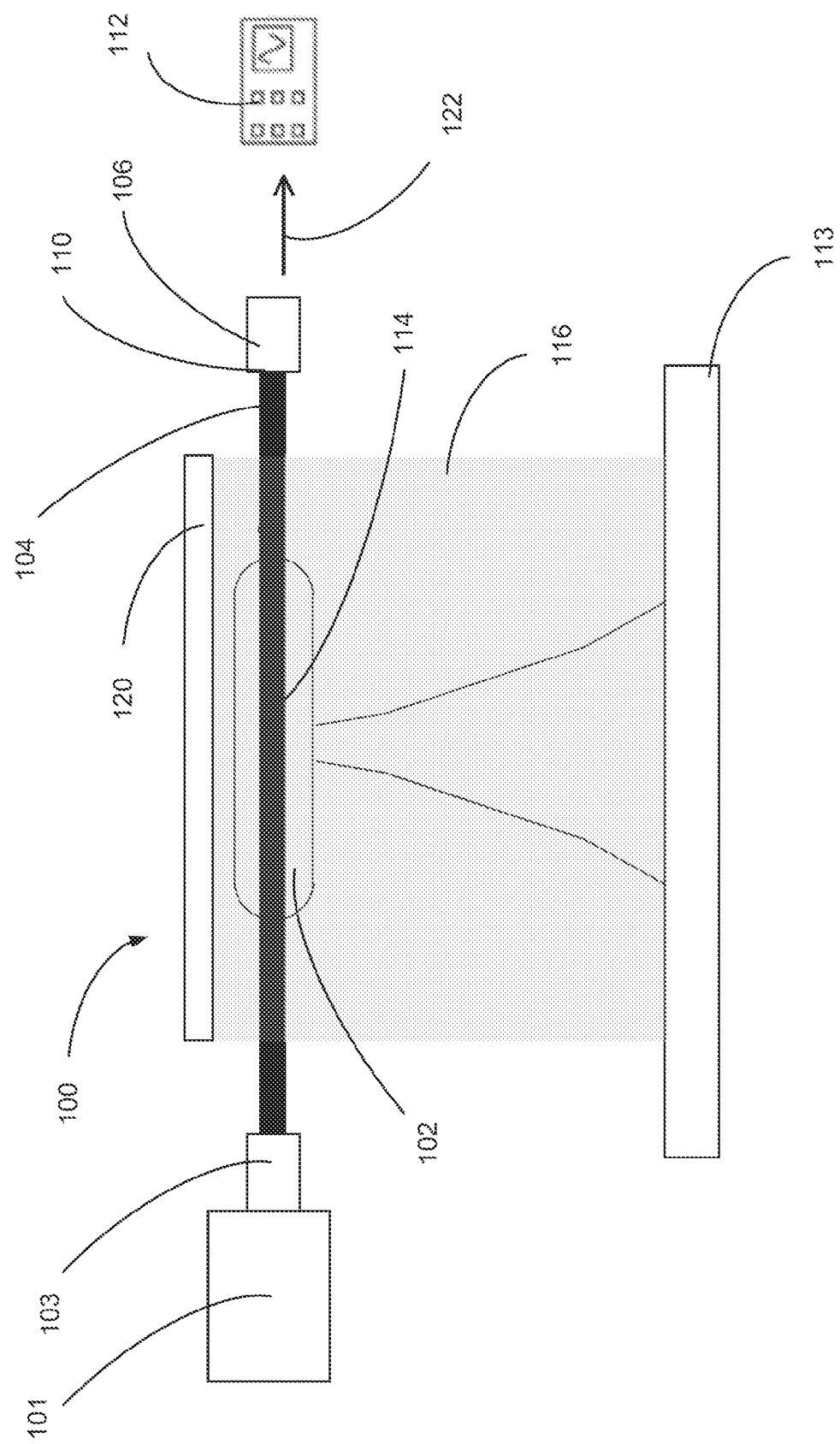
FIG. 4B is a schematic side view of the embedded optical-resonator-based acoustic sensor of FIG. 4A.

FIGS. 4A and 4B are cross-sectional and side schematic views, respectively, of a system 100 similar to the system illustrated in FIG. 3, in which the WGM resonator 102 and a portion 114 of the coupling waveguide 104 are encased in a low-index polymer 116. In one aspect, the low-index polymer 116 maintains the portion 114 of the coupling waveguide 104 and the WGM resonator 102 in a fixed arrangement. In some aspects, the fixed arrangement may include a gap 118 separating the coupling waveguide 104 from the WGM resonator 102. In one aspect, the gap 118 is selected to result in critical coupling of the laser energy directed through the coupling waveguide 104 into the WGM resonator 102. In another aspect, the gap 118 is offset slightly from the critical coupling gap distance to enable the operation of the WGM resonator 102 closer to a maximum loading factor associated with enhanced sensor sensitivity as described in additional detail below.

In various aspects, the selected value of the gap is influenced by any one or more of a plurality of factors including, but not limited to, dimensions and materials of the optical WGM resonator, dimensions and materials of the coupling waveguide, dimensions and materials of the encapsulating polymer, the operational parameters of the optical WGM oscillator-based pressure sensor, and any other relevant factor. A detailed description of the relationship of at least a portion of the factors described above is described in additional detail below.

Referring again to FIGS. 4A and 4B, the low-index polymer 116 is configured to efficiently transfer light between the coupling waveguide 104 and the WGM resonator 102, as well as to efficiently receive ultrasound waves from a tissue subjected to imaging using an ultrasound imaging system, as described in additional detail below. In various aspects, the low-index polymer 116 is applied in an uncured state over the WGM resonator 102, the coupling waveguide 104, and the substrate 113 and is subsequently cured in situ using a curing method. Any known curing method may be used to cure the low-index polymer 116 without limitation, as long as the curing method is compatible with the selected polymer material. Non-limiting examples of suitable curing methods include UV curing, moisture curing, and cross-link curing. In some aspects, the degree of curing may be varied to modulate the acoustic impedance and/or refractive index of the low-index polymer 116 to levels that enable the efficient operation of the system 100 as described in additional detail below. By way of non-limiting example, the curing method may produce a cured polymer characterized by a refractive index suitable for efficient light transfer between the WGM resonator 102 and coupling waveguide 104, as well as a mechanical index matched to a tissue to be subjected to ultrasound imaging. Without being limited to any particular theory, the mechanical matching of the low-index polymer 116 to a tissue may facilitate the efficient transmission of ultrasound pulses emerging from the imaged tissue.

In another aspect, the low-index polymer 116 may be covered with an additional membrane layer 120. In various aspects, the membrane layer 120 may be selected to seal the underlying polymer 116, providing a barrier to prevent oxygen from contacting the polymer 116 and thereby facilitate a curing process, such as a UV curing process described in additional detail below. In some aspects, the membrane layer 120 may be removed from the low-index polymer 116 of the system 100 upon completion of the curing process. In other aspects, the membrane layer 120 may be retained over the exposed surface of the low-index polymer 116. In these other aspects, the material of the membrane layer 120 may be selected to be acoustically matched to a tissue to be imaged using an ultrasound imaging system that includes the sensor system 100 as described in additional detail below.

In various aspects, the membrane layer 120 is any suitable material capable of preventing oxygen from penetrating into the underlying low-index polymer layer 116. Non-limiting examples of suitable membrane layer materials include cover slips, polymer layers, and any other suitable membrane material. Without being limited to any particular theory, the refractive index of the membrane layer does not influence the performance of the encapsulated WGM resonator 102 and the coupling waveguide 104 described herein. In some aspects, the membrane layer 120 may be produced using a material that is acoustically matched to a tissue to be imaged, as described above.

In various aspects, the membrane layer 120 may be pre-formed and applied over the low-index polymer 116, or the membrane layer 120 may be applied over the low-index polymer 116 in an uncured state and cured in place. By way of non-limiting example, applying a pre-formed membrane layer over the low-index polymer may facilitate subsequent removal of the membrane layer upon completion of curing within the low-index polymer as described above. By way of another non-limiting example, a membrane material that is acoustically matched to a tissue to be imaged may be applied and cured in place to enhance the intimacy of contact between the membrane layer and the low-index polymer, thereby promoting the efficient transmission of acoustic signals from the tissue to the underlying sensors.

In various aspects, the thickness of the membrane layer ranges from about 0.1 mm to about 5 mm. In various other aspects, the thickness of the membrane layer ranges from about 0.1 mm to about 0.3 mm, from about 0.2 mm to about 0.4 mm, from about 0.3 mm to about 0.5 mm, from about 0.5 mm to about 0.7 mm, from about 0.6 mm to about 0.8 mm, from about 0.7 mm to about 0.9 mm, from about 0.8 mm to about 1.0 mm, from about 0.9 mm to about 1.1 mm, from about 1.0 mm to about 2 mm, from about 1.5 mm to about 2.5 mm, from about 2 mm to about 3 mm, from about 2.5 mm to about 3.5 mm, from about 3 mm to about 4 mm, from about 3.5 mm to about 4.5 mm, and from about 4 mm to about 5 mm.

FIG. 4B is a side view of the system 100 illustrated in FIG. 4A. As illustrated in FIG. 4B, the ends of the coupling waveguide 104 adjacent to the encased portion 114 project from the low-index polymer encasement 116 to enable the coupling of the light source 101 to the coupling waveguide 104 via the optic coupler 103 and to enable the coupling of the coupling waveguide 104 to the photodetector 106. The photodetector 106 is configured to detect a laser signal output at an output port 110 of the coupling waveguide 104 and to transmit a detector output signal 122 representative of the detected laser signal output.

In various aspects, the computing device 112 is further configured to operate the optical-resonator-based acoustic sensor system 100 in a scanning mode to select an operating wavelength, as well as to operate the system 100 locked at the operating wavelength to detect acoustic signals as described in additional detail below. In one aspect, the computing device 112 is further configured to control and tune the light source to scan wavelengths introduced into the coupling waveguide 104, as well as to perform a selection algorithm to analyze a transmission spectrum of the detector output signal, thereby deriving a detected polarizability value and selecting a matching polarizability value from the plurality of polarizability values, as described in additional detail below.

In various aspects, the optical resonator may be characterized by a diameter ranging from about 50 μm to about 200 μm in various other aspects, the diameter of the resonator ranges from about 50 μm to about 60 μm, from about 55 μm to about 65 μm, from about 60 μm to about 70 μm, from about 65 μm to about 75 μm, from about 70 μm to about 80 μm, from about 75 μm to about 85 μm, from about 80 μm to about 90 μm, from about $85_11111$ to about 95 μm, from about 90 μm to about 100 μm, from about 95 μm to about 105 μm, from about 100 μm to about 120 μm, from about 110 μm to about 130 μm, from about 120 μm to about 140 μm, from about 130 μm to about 150 μm, from about 140 μm to about 160 μm, from about 150 μm to about 170 μm, from about 160 μm to about 180 μm, from about 170 μm to about 190 μm, and from about 180 μm to about 200 μm.

Without being limited to any particular theory, the diameter of the optical resonator may influence at leash one of a plurality of factors related to the performance of the optical-resonator-based pressure sensor including, but not limited to: resonant wavelengths and center frequencies of the pressure sensor.

In various other aspects, the coupling waveguide may comprise any suitable waveguide without limitation. In one aspect, the coupling waveguide is a tapered fiber. In various aspects, the minimum diameter of the tapered fiber ranges from about 0.5 μm to about 5 μm. In various other aspects, the minimum diameter of the tapered fiber ranges from about 0.5 μm to about 0.7 μm, from about 0.6 μm to about 0.8 μm, from about 0.7 μm to about 0.9 μm, from about 0.8 μm to about 1.0 μm, from about 0.9 μm to about 1.1 μm, from about 1 μm to about 2 μm, from about 1.5 μm to about 2.5 μm, from about 2 μm to about 3 μm, from about 2.5 μm to about 3.5 μm, from about 3 μm to about 4 μm, from about 3.5 μm to about 4.5 μm, and from about 4 μm to about 5 μm. Without being limited to any particular theory, smaller taper diameters are thought to optimize the coupling of shorter light wavelengths onto the WGM resonators of the disclosed acoustic sensors as described herein.

In one aspect, the coupling waveguide comprises a tapered fiber with a minimum diameter of at least 1.5 µm, a taper length of about 2 cm, and a fiber end diameter of about 125 µm. In various additional aspects, the coupling waveguides may be constructed of any suitable materials known in the art including, but not limited to, a fused silica material, a low-loss optical polymer, and any other suitable material.

Figure 20A:
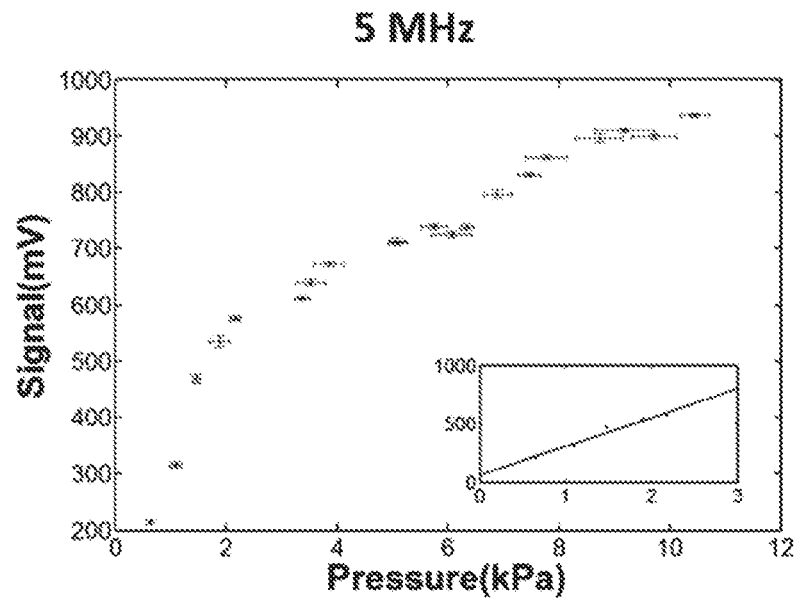
FIG. 20A is a graph summarizing a signal measured by a polymer-enclosed microtoroid pressure sensor in response to 5-MHz ultrasound pulses delivered at various pressures.
Figure 20B:
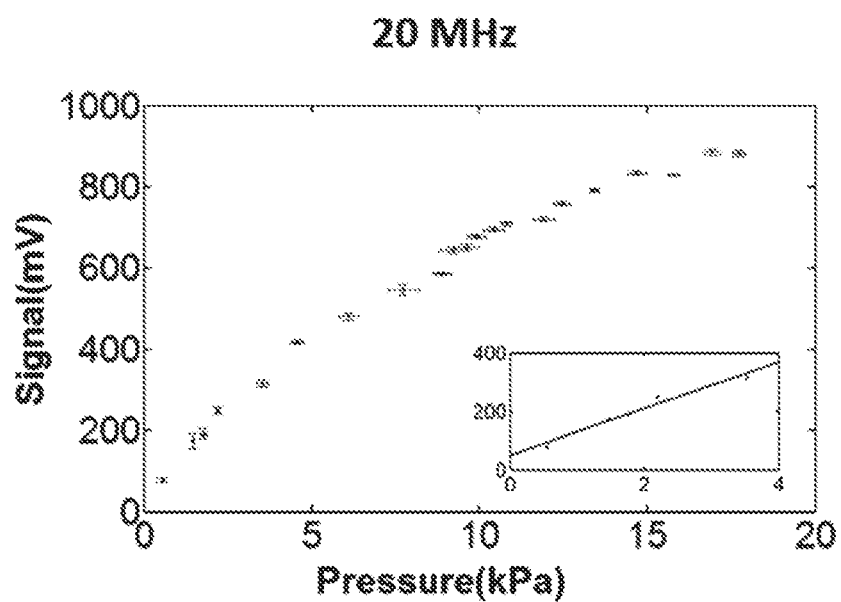
FIG. 20B is a graph summarizing a signal measured by a polymer-enclosed microtoroid pressure sensor in response to 20-MHz ultrasound pulses delivered at various pressures.
Figure 21:
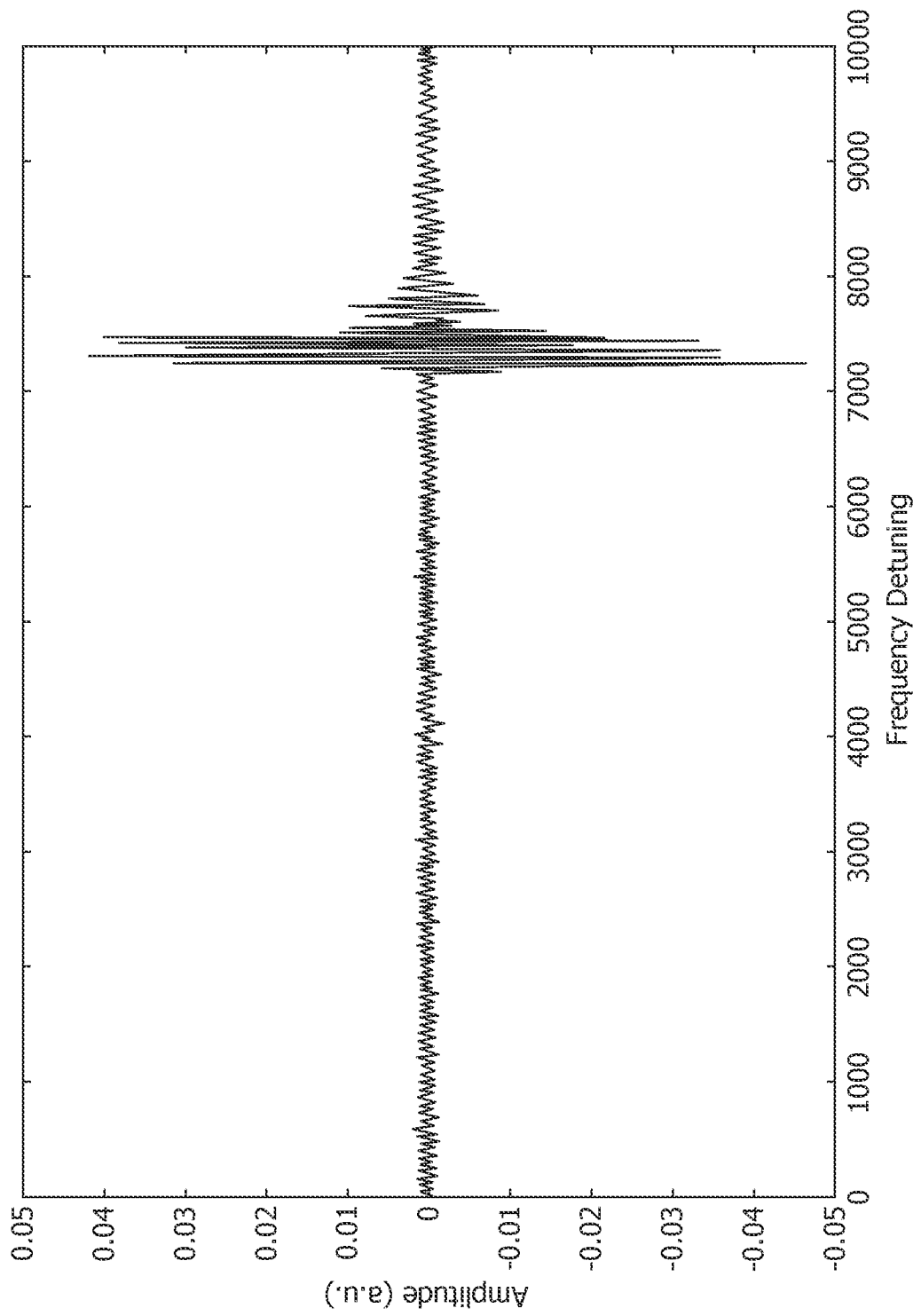
FIG. 21 is a graph summarizing signal amplitude obtained using a polymer-enclosed microtoroid pressure sensor as a function of frequency detuning used to assess SNR for the polymer-enclosed microtoroid pressure sensor.
Figure 22:
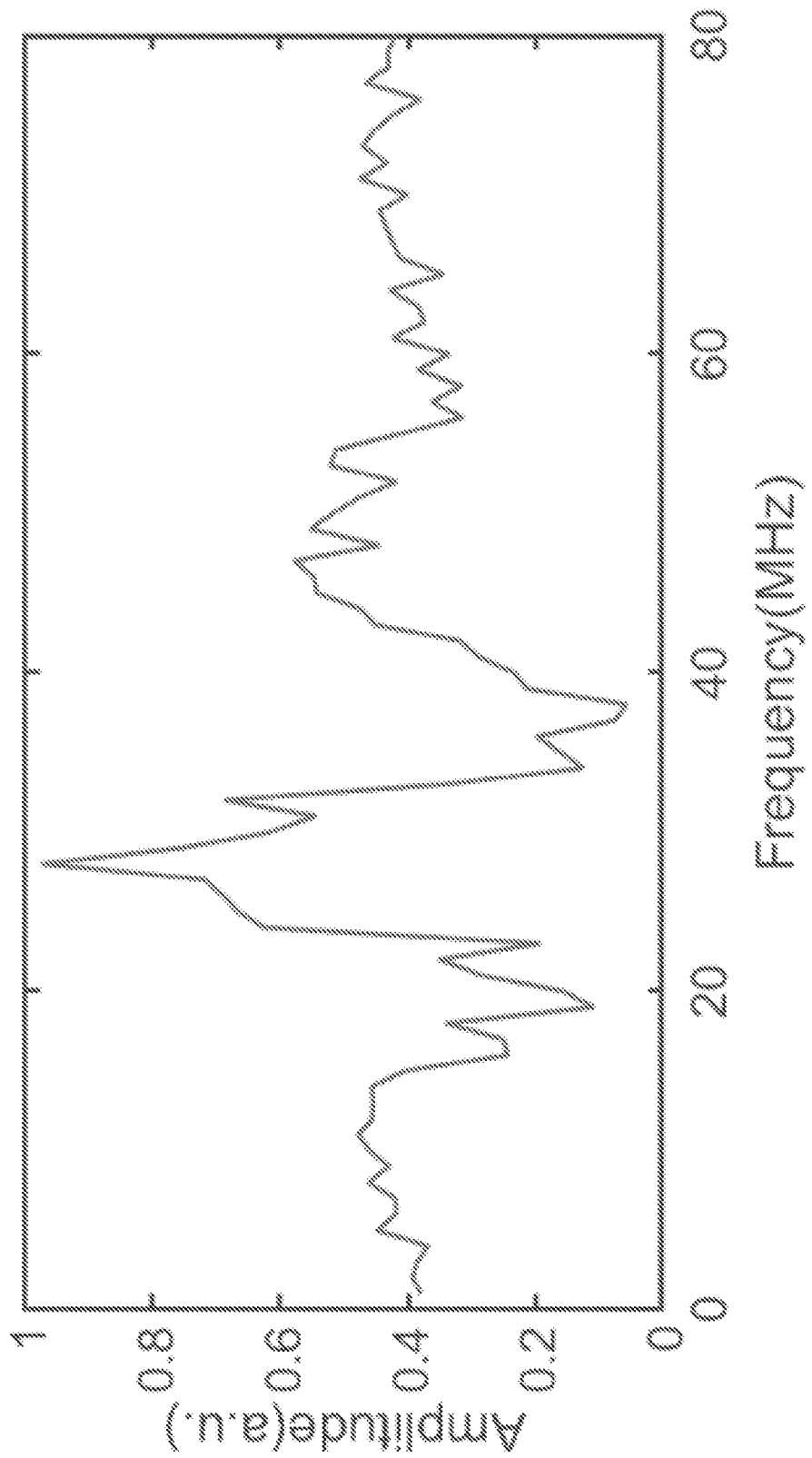
FIG. 22 is a graph illustrating normalized signal amplitudes obtained by a polymer-enclosed microtoroid pressure sensor detecting ultrasound pulses delivered at a range of frequencies.
Figure 23A:
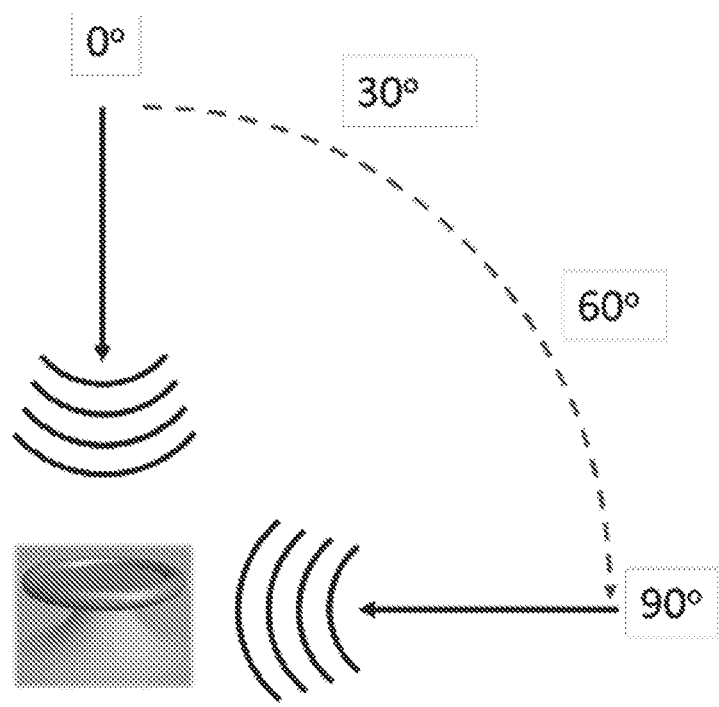
FIG. 23A is a schematic illustration showing the sign convention used to quantify the direction of incident soundwaves onto the surface of the polymer-enclosed microtoroid pressure sensor.
Figure 23B:
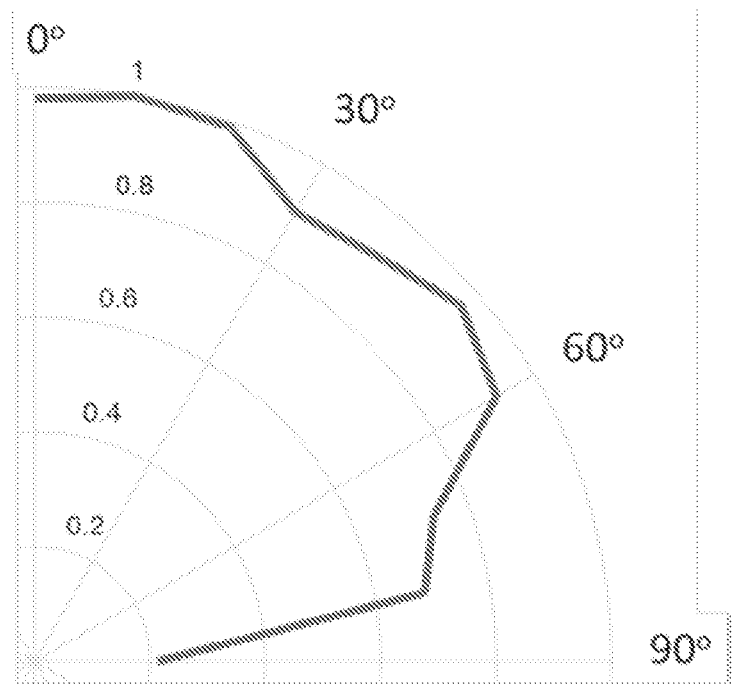
FIG. 23B is a map of normalized signal intensity obtained by a polymer-enclosed microtoroid pressure sensor detecting ultrasound pulses delivered at a range of incident sound angles as defined in FIG. 23A.

In various aspects, the performance of the WGM resonator-based acoustic sensors may be assessed using any suitable existing analysis method without limitation. In one aspect, measurements of ultrasound wave amplitudes obtained by a toroidal resonator-based acoustic sensor may be analyzed using standard methods as illustrated in FIG. 21 to assess SNR and noise equivalent pressure. In another aspect, measurements of response amplitudes of a toroidal resonator-based acoustic sensor at a range of ultrasound wave pressures may be analyzed using standard methods to determine the sensor's sensitivity at different frequencies of ultrasound waves. By way of non-limiting example, the signal amplitudes of a toroidal resonator-based acoustic sensor in response to 5 MHz and 20 MHz ultrasound waves at different wave pressures are illustrated in FIGS. 20A and 20B, respectively. In an additional aspect, measurements of response amplitudes of a toroidal resonator-based acoustic sensor for a range of ultrasound wave frequencies may be analyzed using standard methods to determine the sensor's bandwidth as illustrated in FIG. 22. The acoustic sensing performance of an acoustic sensor that includes a polymer-encased WGM resonator as described herein are summarized in Table 1:

TABLE 1

Performance of Acoustic Sensor with Encased WGM-Resonator.

| | |
|---|---|
| Noise Equivalent Pressure | 10 Pa over 1-50 MHz |
| Sensitivity | 250 mV/kPa @ 5 MHz |
| | 80 mV/kPa @ 20 MHz |
| Bandwidth | 50 MHz |

By way of another non-limiting example, the acoustic sensing performance of the acoustic sensor as characterized in Table 1 is compared to the corresponding performance of a conventional piezoelectric transducer in Table 2 below:

TABLE 2

Comparison of Performance of Acoustic Sensor with Encased WGM-Resonator and Conventional, Medical-Grade Ultrasound Devices.

| | WGM-Based Sensor | Conventional Ultrasound |
|---|---|---|
| Sensitivity (mV/kPa) | 250 | ~0.01 |
| Noise-Equivalent-Pressure (Pa) | 0.63 | <10 |
| Operating Bandwidth (MHz) | 1-80 | 1.5-7 |
| | | 4-8 |
| | | 5-15 |

Figure 6:
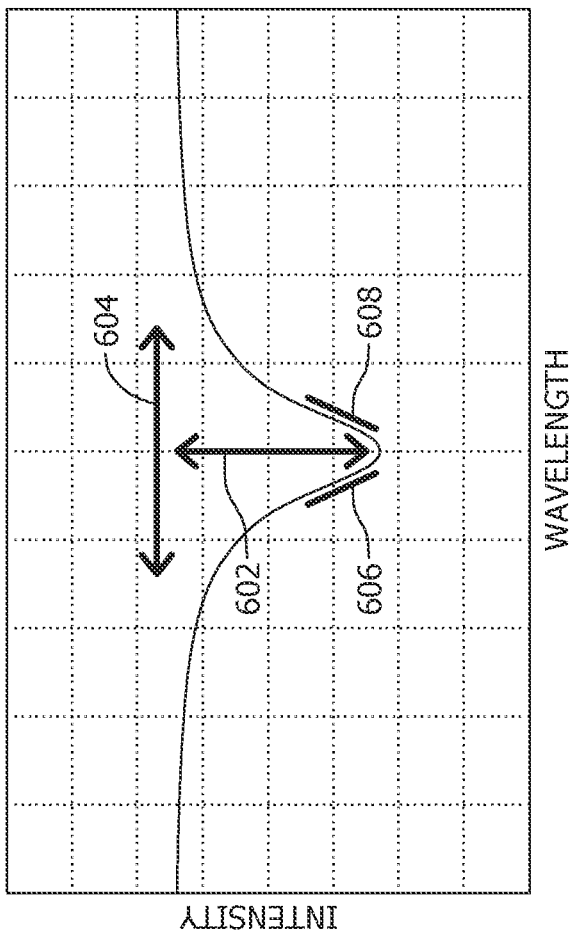
FIG. 6 is a spectrum of transmitted light intensity through the optical-resonator-based acoustic sensing probe as a function of transmitted light wavelength.

Referring to FIG. 6, the transmission spectrum obtained from a high-Q WGM typically has a Lorentzian line shape. As illustrated in FIG. 24, an incoming ultrasound wave may induce refractive index modulation and/or shape deformation (see left-hand images in FIG. 24), which is translated into a resonance shift in the transmission spectrum (see right-hand graph in FIG. 24). If the operation wavelength is fixed, the variation in the resonant frequency is reflected as oscillations of the transmitted optical power over time (see output power signal in right graph of FIG. 24). In one aspect, to maximize the amplitude of the output oscillation induced by the incoming ultrasound, the operating wavelength is set to a wavelength corresponding to a point 2402 on the transmission spectrum with the largest slope.

It should be noted that only the thermally stable side is favored. Without being limited to any particular theory, the thermally stable side is either a shorter-wavelength side or a longer-wavelength side, depending on at least one factor including, but not limited to, the material-related thermo-optical coefficient of the resonator. If the thermo-optical coefficient of the resonator is dominated by dielectric materials including, but not limited to, silica, silicon, silicon nitride, which are characterized by positive thermo-optical coefficients, the shorter-wavelength side (region 606 in FIG. 6) is thermally stable. If the thermo-optical coefficient of the resonator is dominated by polymer materials, which are characterized by negative thermo-optical coefficients, the longer-wavelength side (region 608 in FIG. 6) is thermally stable.

Figure 25:
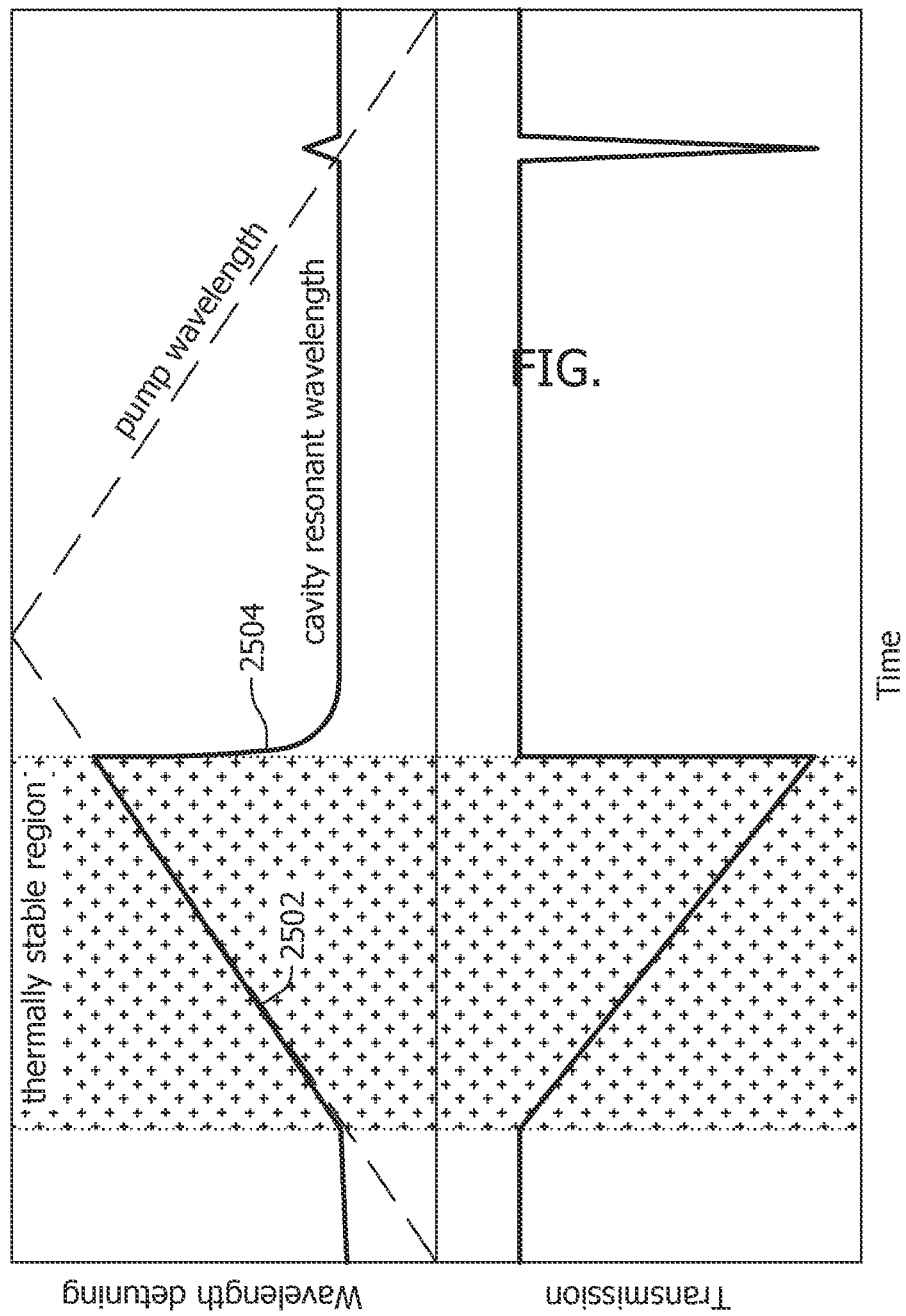
FIG. 25 contains graphs showing the wavelength detuning and transmission within a resonator during wavelength up-scanning of the resonator.

As illustrated in FIG. 25, the thermally stable region in the transmission spectrum of a high Q microresonator is identified as having a triangular shape 2502 during the wavelength scanning processes. By way of non-limiting example, for a high Q silica microresonator made of dielectric materials with positive thermo-optical coefficients (dn/dT>0), as the wavelength of the pump laser approaches the resonant wavelength during the wavelength up-scanning process, the cavity begins to heat up, which red shifts the resonant wavelength, making the up-scan a pursuit process between resonant wavelength and scanning pump wavelength, i.e., both the resonant wavelength and the scanning pump wavelength shift in the same direction. Specifically, both the resonant and pump wavelengths increase linearly, while the wavelength detuning between them decreases linearly. In this pursuit process, the pump wavelength (shown as dashed line in top graph of FIG. 25) tracks the moving resonant wavelength (shown as solid line in top graph of FIG. 25) and the detuning between them is within the bandwidth of the resonance. Therefore, the resonator is operated in a resonant state and the pump laser energy is coupled into the resonator. This pursuit process continues until the pump wavelength catches up with the resonant wavelength. Beyond this point, the resonant state is lost rapidly at region 2504 of the moving resonant wavelength since the pump laser cannot push the resonant wavelength further.

Note that the thermally stable region may be identified either during wavelength up-scanning (see FIG. 25) for resonator materials with positive thermo-optical coefficients as described above, or during wavelength down-scanning (not illustrated) for resonator materials with negative thereto-optical coefficients. If the thermo-optical coefficient of the resonator is dominated by dielectric materials like, silica, silicon, silicon nitride with thermo-optical coefficient >0), the wavelength up-scanning side (shorter wavelength side) is thermally stable. If the thermo-optical coefficient of the resonator is dominated by polymers (thermo-optical coefficient <0), the wavelength up-scanning side (longer-wavelength side) is thermally stable.

a. Arrangement of Resonator and Optic Fiber

In various aspects, the dimensions and arrangement of the optic fiber and optical resonator are determined according to one or more rules incorporating various factors related to performance of the sensor. In one aspect, a separation rule may be used to determine a gap separating the tapered optic fiber and the outer circumference of the optical resonator. In another aspect, the dimensions and arrangement of the optic fiber and optical resonator may be influenced by a plurality of factors, described below.

Without being limited to any particular theory, the dimension of the fiber waveguide determines the effective index of the waveguide mode, and the gap between the fiber taper and the resonator determines the coupling strength, which may be quantified alternatively as coupling-induced loss. An ideally excited WGM, also referred to herein as critically coupled, is characterized by a narrow and deep Lorentzian dip shape within the transmission spectrum of the coupled WGM and fiber taper. This critical coupling is achieved when i) the effective index of fiber waveguide mode matches the effective index of the WGM and ii) the coupling-induced loss is equal to the intrinsic loss inside the resonator.

b. Determination of Ideal Fiber Taper

In various aspects, the ideal fiber taper to excite optical modes in whispering-gallery-mode (WGM) microtoroid resonators are determined using various criteria, described in additional detail below.

In one aspect, the ideal fiber taper should satisfy the phase matching condition with the target WGMs, as expressed by:

$$n_{fiber} = n_{WGM,tr} \quad \text{Eqn (1)}$$

where $n_{WGM,tr}$ is the transformed effective index of the WGM microtoroid resonators ($n_{WGM}$); $n_{fiber}$ is determined by the diameter and refractive index of the fiber taper; and $n_{WGM}$ is decided by the size and refractive index of the resonator as well as the refractive index of the surrounding medium. In various aspects, both $n_{fiber}$ and $n_{WGM}$ may be numerically computed using any suitable method known in the art including, but not limited to, a finite element method (FEM).

$n_{fiber}$

Figure 1D:
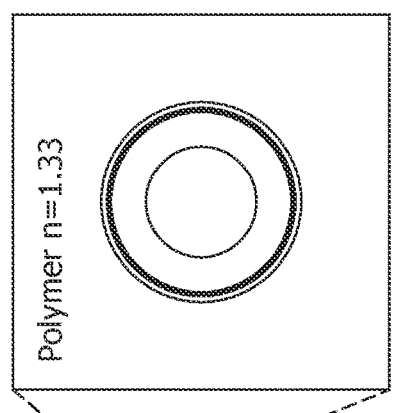
FIG. 1D is a map illustrating the fiber mode distribution for the 1.6-μm optic fiber shown in FIG. 1C.
Figure 1C:
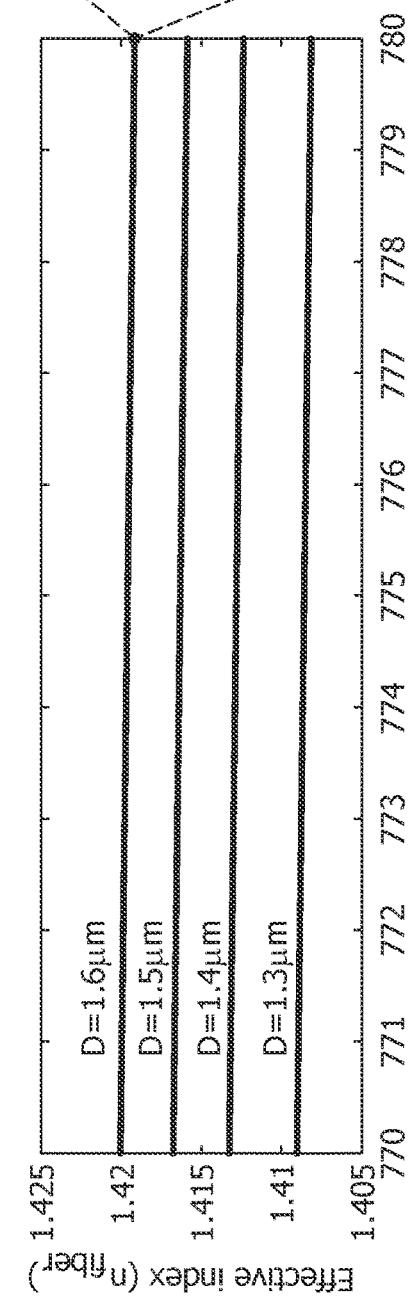
FIG. 1C is a graph summarizing fiber mode index as a function of wavelength for several different diameters of optic fiber in a polymer with a refractive index (n) of 1.33.

In one aspect, the FEM mode analysis is applied to simulate the mode distribution and effective indices of fiber modes with different diameters and surrounding materials, as illustrated in FIGS. 1A-1D for several different taper diameters in air (FIGS. 1A and 1B) and in a low-index (n=1.3) polymer (FIGS. 1C and 1D).

$n_{WGM}$

In an additional aspect, FEM eigenfrequency analysis (2D rotational symmetric model) is applied to simulate the mode distribution and eigenfrequencies of the WGM microtoroid resonators. In this aspect, $n_{WGM}$ is derived using the equation:

$$n_{WGM} = mc/\omega R_e \quad \text{Eqn. (2)}$$

where m is the azimuthal mode number; c is speed of light; ω is the simulated eigenfrequency; and $R_e$ is the radial position of "mode mass center", denoted by:

$$R_e = \iint n(r)^2 E^2 r dS / \iint n(r)^2 E^2 dS \quad \text{Eqn. (3)}$$

where E is the amplitude of the electric field, n(r) is the refractive index.

$n_{WGM,tr}$

In another aspect, $n_{WGM,tr}$ is determined using the following expression:

$$n_{WGM,tr} = n_{WGM}\left(1 - \frac{d_{sep}}{2R_e}\right) \quad \text{Eqn.(4)}$$

where $d_{sep}$ is the distance between the WGM "mode mass center" and the fiber center.

When the coupling gap is very small, i.e., the fiber taper almost touches the resonator:

$$d_{sep} \sim 2a + a_f + R_p - R_e \quad \text{Eqn. (5)}$$

where a and $a_f$ are minor radii of the microtoroid and fiber taper radius, respectively and $R_p$ is the major radius of the microtoroid resonator.

FIGS. 2A, 2C, and 2E are graphs summarizing the effective indices $n_{WGM,tr}$ and $n_{fiber}$ with varying fiber taper diameters at wavelengths of 883 nm, 778 nm, 709 nm, respectively generated using the equation and methods described above. FIGS. 2B, 2D, and 2F are maps of fiber mode distributions for the optic fibers of FIGS. 2A, 2C, and 2E, respectively. FIGS. 2A, 2C, and 2E show that ideal taper diameters for polymer background are 1.41 μm, 1.31 μm, 1.25 μm at wavelengths of 883 nm, 778 nm, 709 nm, respectively.

c. Low-Index Polymer Layer

In various aspects, the WGM resonator and a portion of the coupling waveguide are encased in a low-index polymer material. The polymer encasement performs a variety of functions related to the fabrication, incorporation into various devices such as ultrasound imaging systems, and use of the WGM resonator-based optical pressure sensor to detect pressures as described herein. In some aspects, the polymer encasement performs a three-fold function: i) protecting the coupling region, 2) effectively delivering the input acoustic signal, and iii) acting as a damping layer for the oscillating structure. The multiple functions performed by the encasement polymer impose constraints on the selection of the encasement polymer material and polymer layer dimensions.

In one aspect, the encasement polymer material is selected to enable rapid curing with minimal change in refractive index and density. In another aspect, the encasement polymer material is selected to be acoustically transparent to the input signal including, but not limited to, ultrasound pulses emerging from a tissue to be imaged using an ultrasound or photoacoustic imaging system. In an additional aspect, the acoustic signal delivered to the WGM resonator-based pressure sensor may be enhanced by engineering the dimension of the encasement polymer layer. In this additional aspect, the thickness of the encasement layer may be set to be (¼+n/2) times of acoustic center wavelength, and/or a convex upper boundary may be formed into the polymer encasement layer to enhance acoustic focusing on the WGM resonator. In another additional aspect, the encasement polymer material is selected to enhance the effective damping of the mechanical oscillations of the resonator structure in response to received pressure pulses to eliminate a response tail to a pulsed acoustic input.

In one exemplary aspect, the encasement polymer material may be selected and engineered to enhance sensor sensitivity by shaping the encasement polymer layer as described above, while minimizing response tails due to mechanical oscillation or multireflection by selecting a polymer with a suitable level of acoustic damping.

In various aspects, the encasement polymer material may be a low-index polymer, defined herein as a polymer with a refractive index less that the corresponding refractive indices of the WGM resonator and coupling waveguide. Without being limited to any particular theory, the inclusion of a encasement polymer material results in enhanced coupling induced mode broadening of the WGM resonator and coupling waveguide relative to an equivalent system in air. By way of non-limiting example, the fiber mode distribution for an optic fiber encased in a low-index polymer (see FIG. 1D) is broader as compare to the corresponding fiber mode distribution for the optic fiber in air (see FIG. 1B). Consequently, the refractive index of the selected encasement polymer may ameliorate the sensitivity of sensor performance to precise positioning of coupling fiber at an optimal gap separation distance, as described in additional detail below. Without being limited to any particular theory, refractive index contrast ($n_{contrast}=n_{resonator}/n_{polymer}$), described in additional detail below, influences the Lorentzian lineshape (FIG. 6) and loading curve (FIG. 16B) of the WGM resonator. In particular, as $n_{contrast}$ approaches unity, the Lorentzian lineshape and loading curve are broadened, and the Q factor is decreased.

In various other aspects, the acoustic impedance of the encasement polymer material may be matched to the corresponding acoustic impedance of a sample to be subjected to ultrasound imaging using an ultrasound imaging system incorporating the WGM resonator-based pressure sensor. By way of non-limiting example, PDMS is a polymer with a relatively low degree of acoustic mismatch (approximately 2-fold) with typical biological tissues. In various additional aspects, the acoustic damping of the encasement polymer material may be selected to inhibit internal echoing of ultrasound waves within the encased pressure sensor, while maintaining efficient transmission of the ultrasound waves to the WGM resonator.

In various aspects, any suitable optical polymer known in the art may be selected for use as an encasement polymer without limitation. In various aspects, the encasement polymer includes, but is not limited to, UV-cured polymers or water-cured polymers. Non-limiting examples of suitable encasement polymer materials include PDMS, PFOA, and non-PFOA type fluoro (meth)acrylates.

d. Center Frequency

In various aspects, the center frequency of the acoustic response band of the WGM-based sensor is determined by the intrinsic mechanical mode of the resonator. By way of non-limiting example, in a microsphere, the mechanical resonant frequency for the same order mechanical mode is inversely proportional to the diameter of the microsphere resonator, in agreement with the theoretical expectation based on the free sphere model. By way of another non-limiting example, for chip-based microdisk or microtoroid resonators, the mechanical resonant frequency is approximatively inversely proportional to the length of the freestanding disk membrane, i.e., undercut size.

e. Coupling Gap

In various aspects, the coupling gap of the WGM resonator-based pressure sensor is selected to enhance any one or more of at least several sensor performance parameters including, but not limited to, critical coupling of the WGM resonator and coupling waveguide, and sensor sensitivity.

Without being limited to any particular theory, the coupling induced mode broadening $\kappa_c$ is found to be proportional to $\exp(-2\gamma d)$ where $\gamma$ is the field attenuation coefficient outside the resonator body (estimated by $2\pi\sqrt{n_{contrast}^2-1}/\lambda$), and d is the width of coupling gap. In the air background $n_{contrast}=n_{resonator}$, and in polymer packaging $n_{contrast}=n_{resonator}/n_{polymer}$.

Figure 16A:
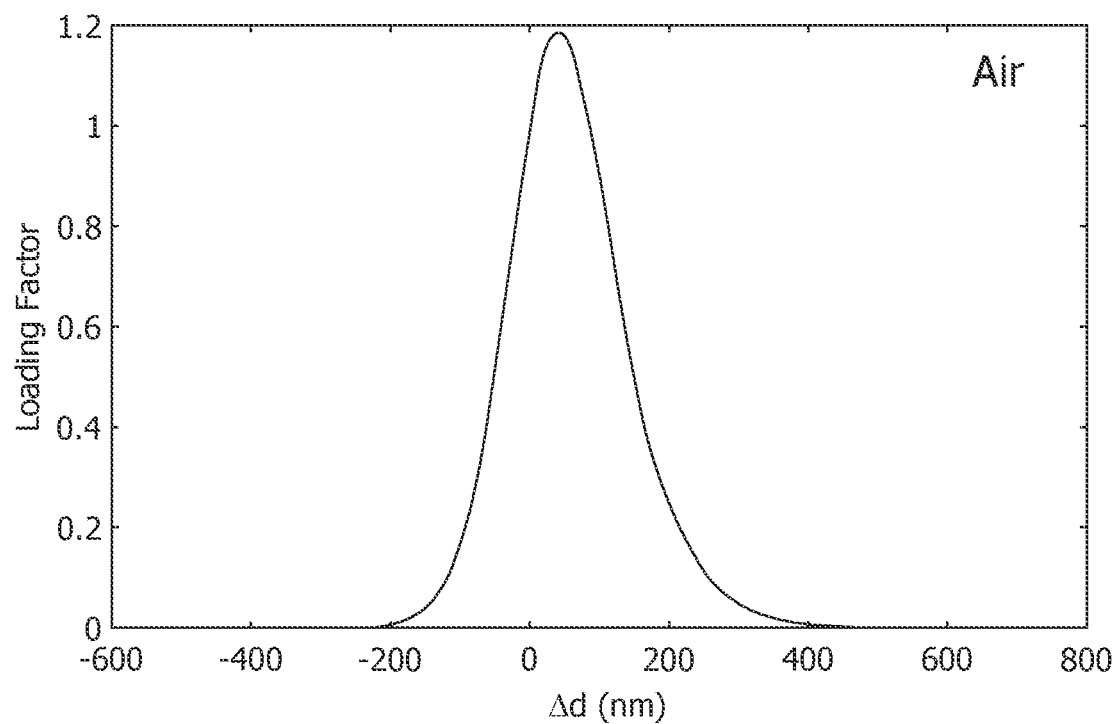
FIG. 16A is a graph summarizing a sensitivity loading factor with respect to gap detuning from critical coupling of an optical-resonator-based acoustic sensor in air.
Figure 16B:
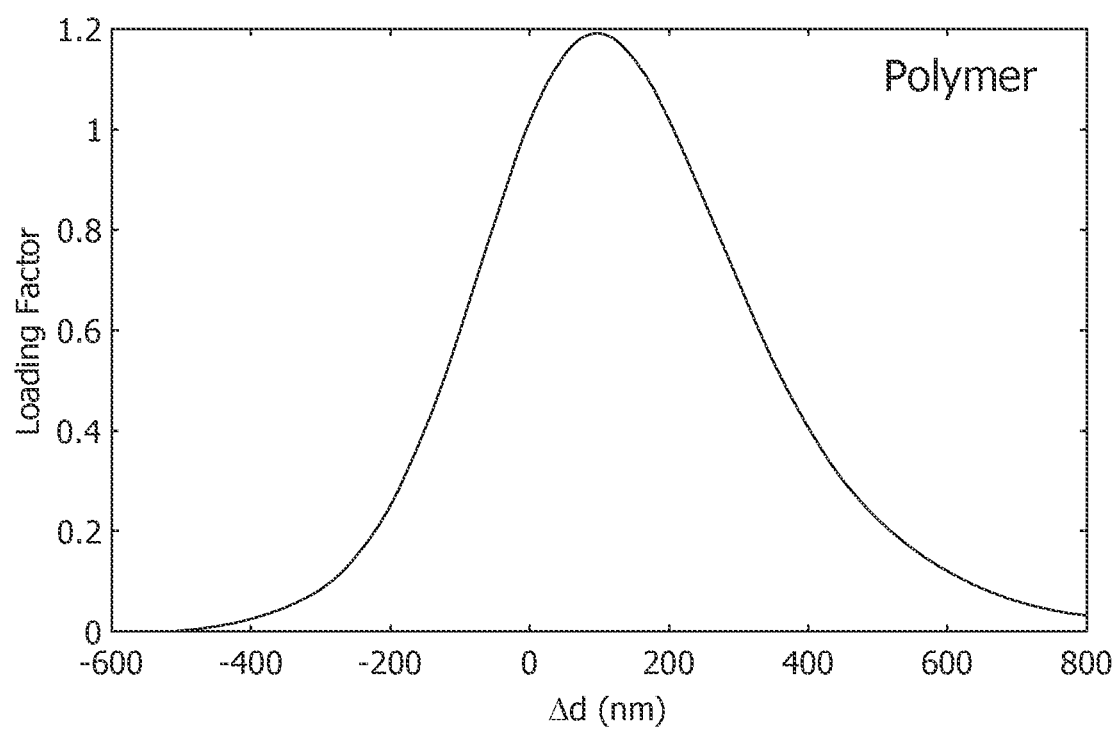
FIG. 16B is a graph summarizing a sensitivity loading factor with respect to gap detuning from critical coupling of an optical-resonator-based acoustic sensor encased in an n=1.33 polymer.
Figure 17A:
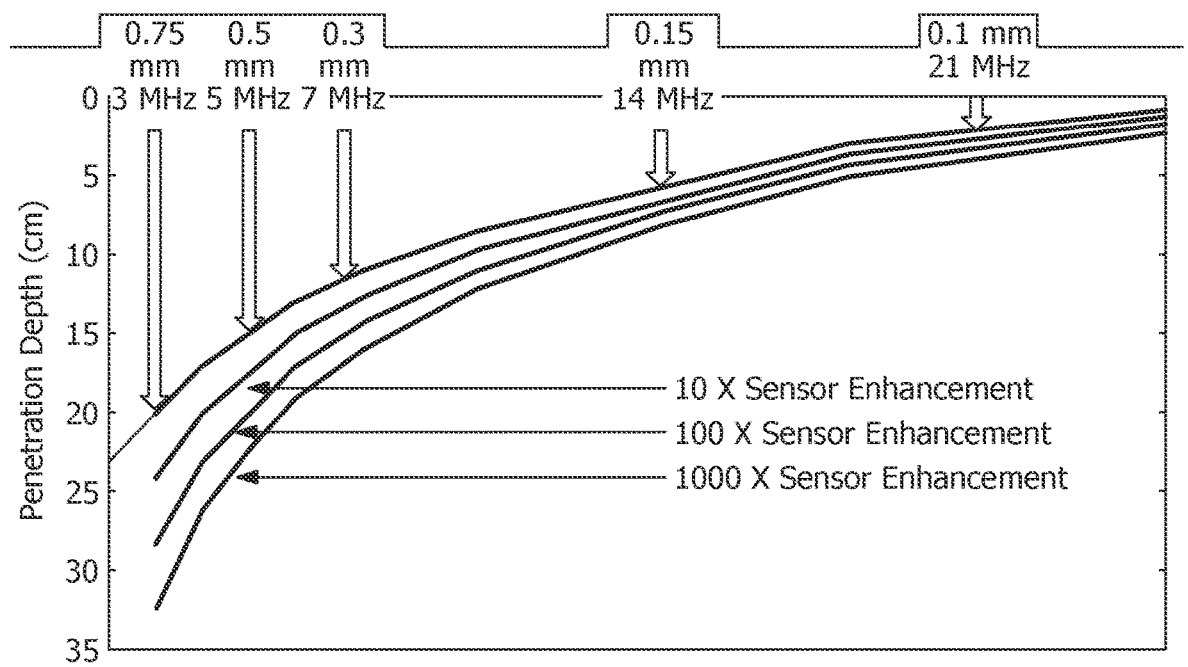
FIG. 17A is a graph illustrating the penetration depth of an ultrasound sensor as a function of ultrasound frequency for various sensor enhancements enabled by the incorporation of an optical-resonator-based acoustic sensor with various degrees of sensor enhancement in a tissue sample representative of fat or breast tissue.
Figure 17B:
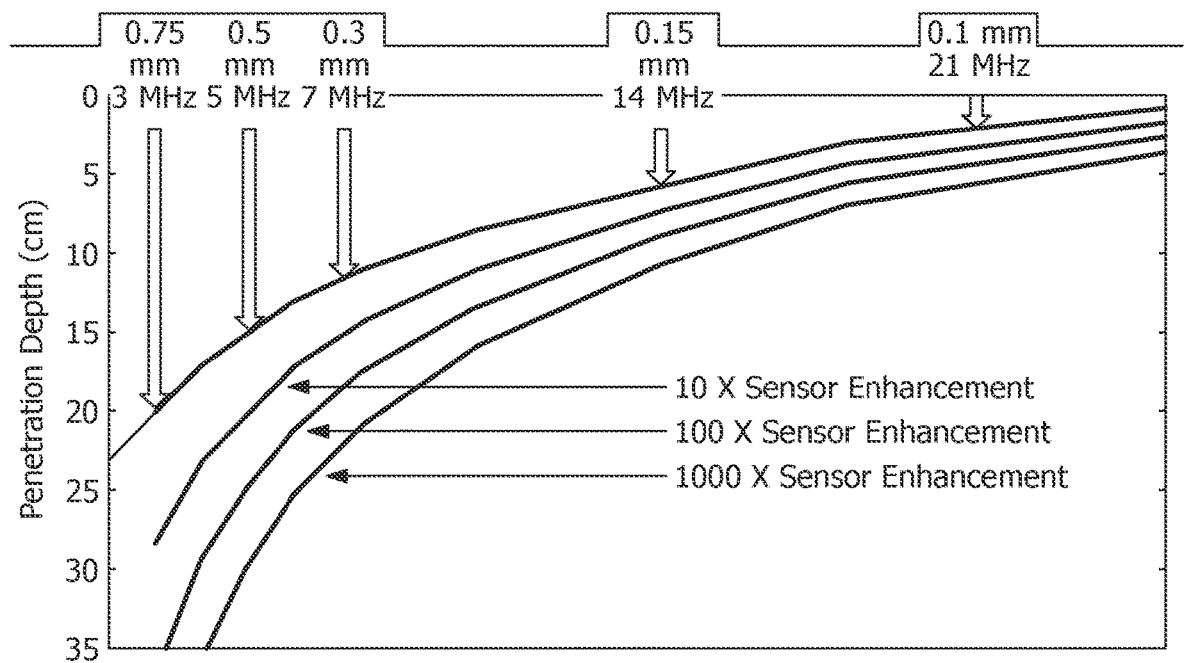
FIG. 17B is a graph illustrating the penetration depth of an ultrasound sensor as a function of ultrasound frequency for various sensor enhancements enabled by the incorporation of an optical-resonator-based acoustic sensor with various degrees of sensor enhancement in a tissue sample representative of blood.
Figure 18A:
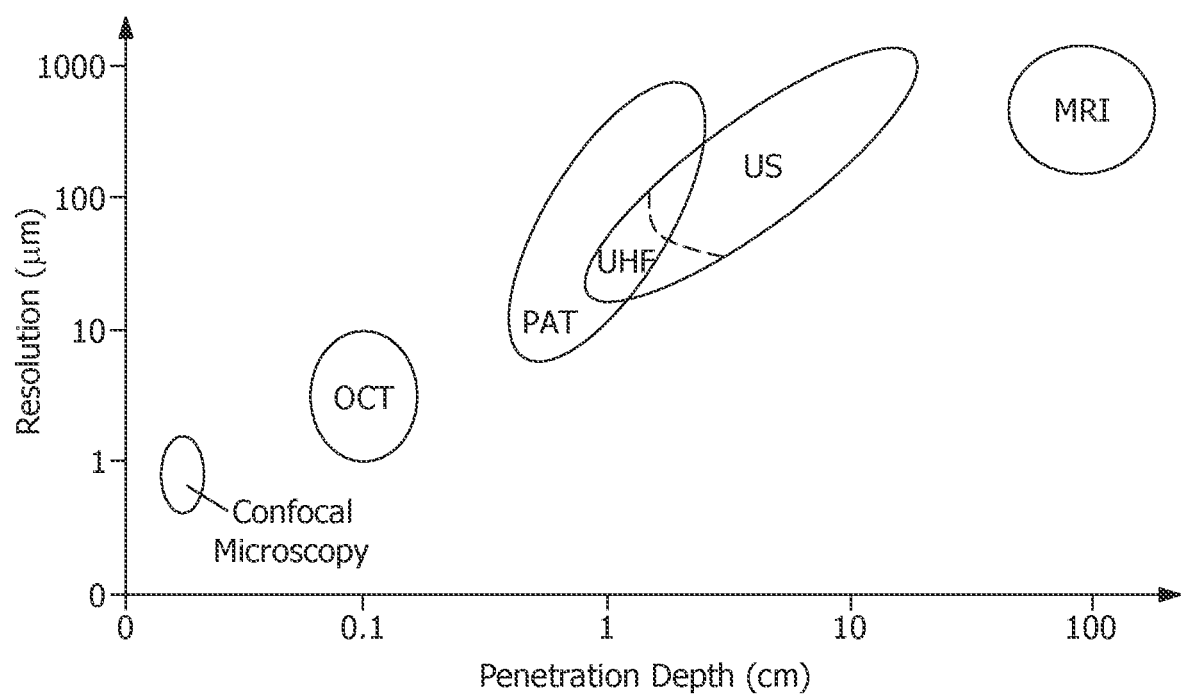
FIG. 18A is a graph summarizing various existing imaging modalities (OCT/Optical Coherence Tomography, PAT/Photoacoustic Tomography, US/Ultrasound, and MRI/Magnetic Resonance Imaging) mapped as a function of image resolution and penetration depth.
Figure 18B:
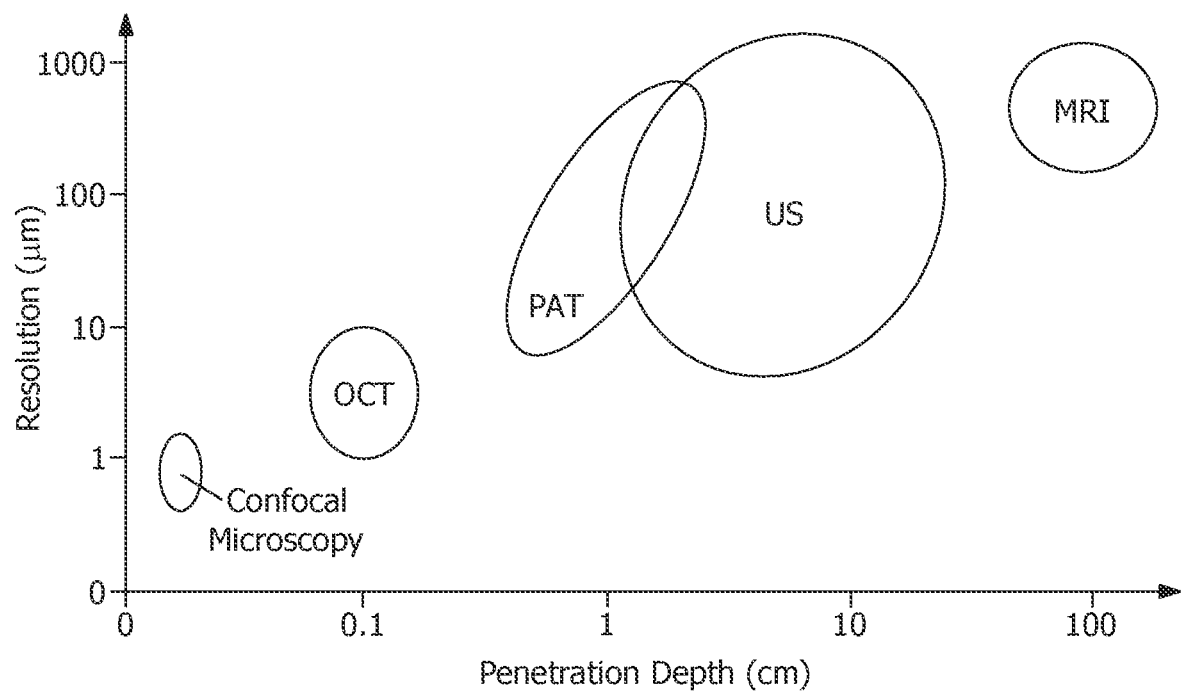
FIG. 18B is a graph corresponding to the graph of FIG. 18A illustrating the effect of the improved sensitivity provided by optical-resonator-based acoustic sensors in various imaging modalities in accordance with an aspect of the disclosure.

In some aspects, sensitivity of the WGM resonator-based pressure sensor is enhanced when the laser frequency is locked on the center of one side of the Lorentzian lineshape of the WGM resonator, as illustrated in FIG. 16A for a sensor with no encasement (air), and in FIG. 16B for a sensor with a low-index polymer encasement. When thermally locked, the short-wavelength side is stable for materials with positive thermo-optical coefficients (dielectric materials), while the long-wavelength side is stable for materials with negative thermo-optical coefficients (polymers). Analytically, this may be expressed as:

$$T(\Delta\omega) = 1 - \frac{\kappa_0\kappa_C}{(\Delta\omega)^2 + \left(\frac{\kappa_0+\kappa_C}{2}\right)^2} \quad \text{Eqn. (6)}$$

$$Q_0 = \frac{\omega_0}{\kappa_0}, Q_c = \frac{\omega_0}{\kappa_C} \quad \text{Eqns. (7) and (8)}$$

$$\Delta\omega_{ideal} = \pm\frac{(\kappa_0+\kappa_C)}{\sqrt{12}} \quad \text{Eqn. (9)}$$

where $\Delta\omega$ is the angular frequency detuning between pump laser and the real-time resonance, and T is the observable transmission.

In other aspects, the ideal operation detuning occurs at the largest slope in the transmission spectrum, so that the small signal indicated by the resonance shift could be amplified the most. In addition, the coupling induced $\kappa_c$ is related to the depth and the width of the Lorentzian lineshape of the transmission. By way of non-limiting example, FIG. 6 is a graph of a transmission spectrum, on which the depth 602, width 604, and maximum slope 606 are denoted.

In one aspect, a standard coupling criterion is defined to be "critical coupling", where $\kappa_0=\kappa_c$, and the deepest lineshape is achieved with a straightforward indicator of full extension of transmitted power. Since there is $\kappa_c=\kappa_0\exp(-2\gamma d)$, where $\Delta d$ is the gap width detuning from the gap of critical coupling, the theoretical sensitivity, proportional to $T'(\Delta\omega_{ideal})$, could be written as a function of $\Delta d$:

$$T'(\Delta\omega_{ideal}) = \frac{18e^{-2\gamma\Delta d}}{\sqrt{12}\kappa_0(1+e^{-2\gamma\Delta d})^3} \quad \text{Eqn. (10)}$$

By normalizing the sensitivity at critical coupling, a loading factor induced by the coupling is defined:

$$\Gamma(\Delta d) = \frac{8e^{-2\gamma\Delta d}}{(1+e^{-2\gamma\Delta d})^3} \quad \text{Eqn. (11)}$$

As illustrated in FIGS. 16A and 16B, the loading factors at 780 nm in air and in polymer (n=1.33), respectively are plotted.

f. Microtoroid Fabrication Method

Figure 12:
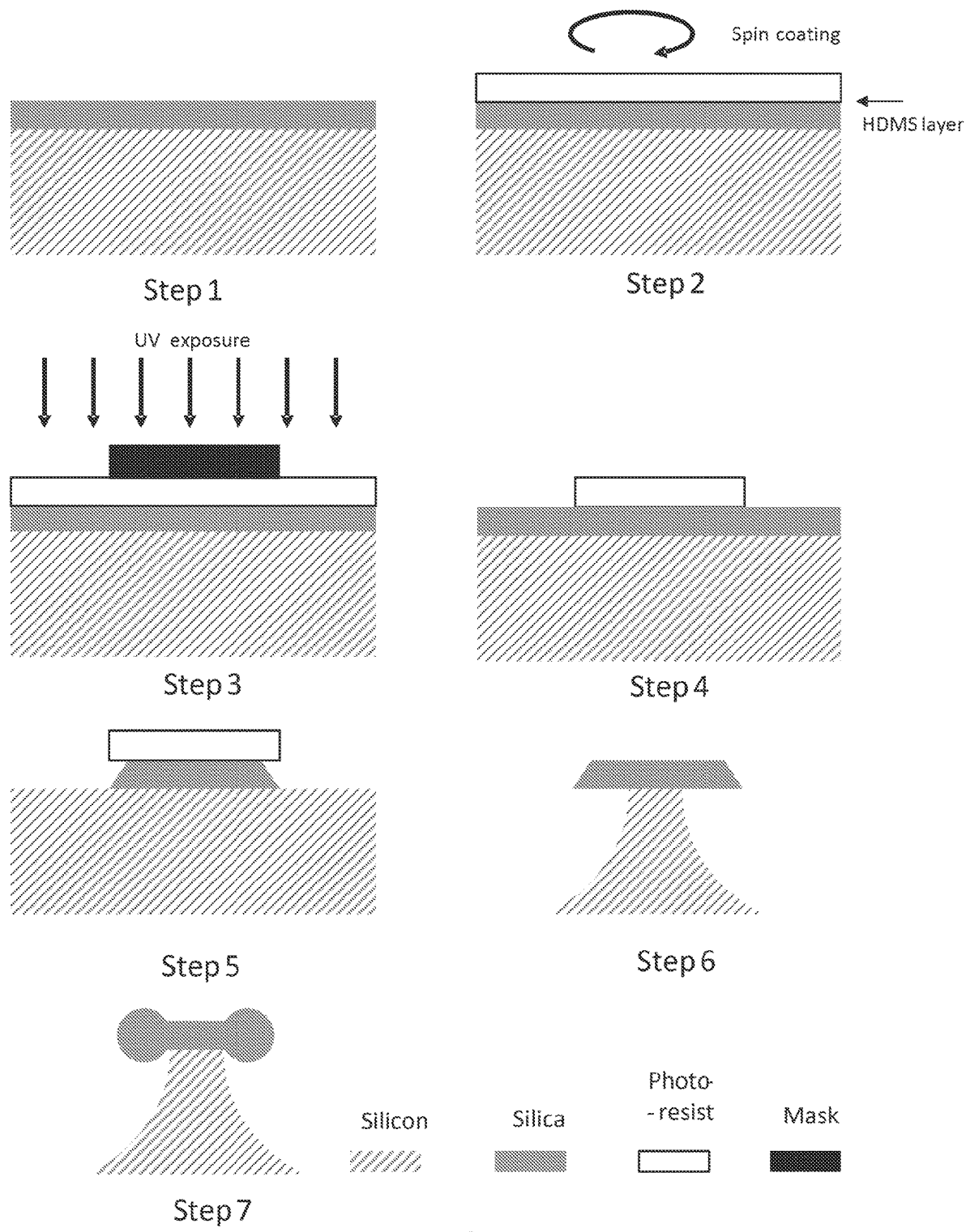
FIG. 12 is a schematic diagram illustrating a method of producing a microtoroid resonator in accordance with one aspect of the disclosure.
Figure 19:
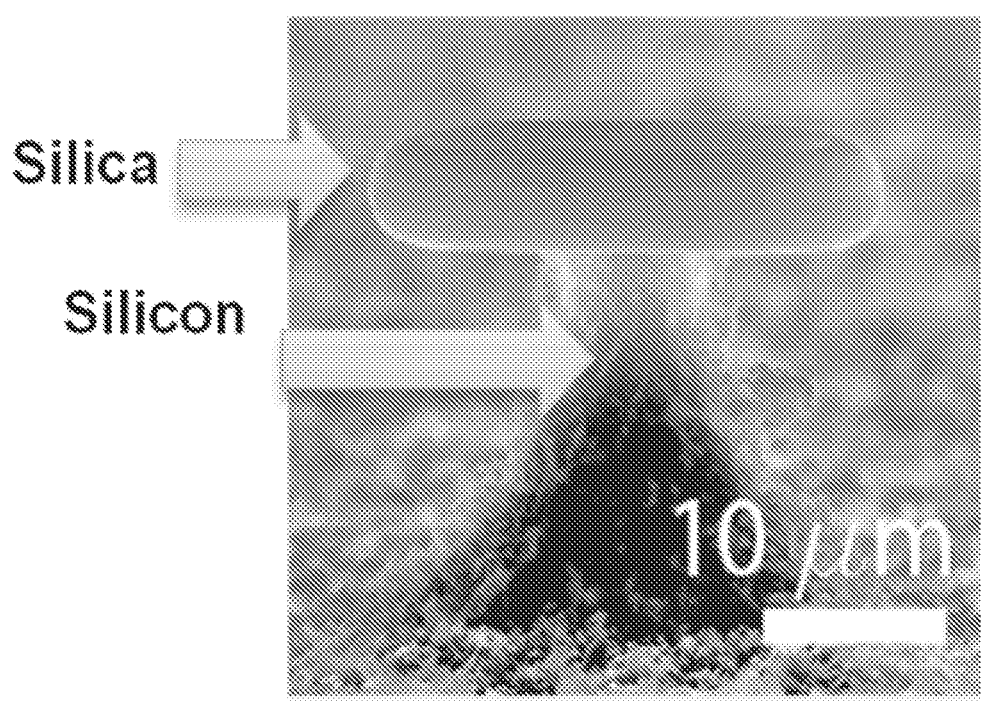
FIG. 19 is an optical micrograph image showing a single microtoroid sensor in accordance with an aspect of the disclosure.

In various aspects, microtoroid WGM resonators may be fabricated on silicon wafers or any other suitable substrate using any suitable method known in the art. By way of non-limiting example, FIG. 12 is a summary of a microtoroid fabrication method in one aspect. Referring to FIG. 12, a silica layer is oxidized on a single-crystal silicon substrate (Step 1), and HDMS is deposited over the silica layer by any suitable method including, but not limited to, thermal evaporation and spin coating (Step 2). In this aspect, a UV mask is deposited over the photoresist followed by UV exposure (Step 3) to remove the unmasked photoresist during developing (Step 4). The portion of the silica layer exposed by the removal of the photoresist is removed using any suitable method without limitation. Portions of the silicon substrate are removed to form a support column (Step 6) using any suitable method, followed by the formation of a silica lip around the perimeter of the silica layer by any known method including, but not limited to, $CO_2$ laser reflowing (Step 7) to complete the microtoroid. An image of a microtoroid fabricated using the method described above is provided in FIG. 19.

In various aspects, the optical resonator may be provided in any suitable form including, but not limited to, a microtoroid, a microdisk, a microring, a microsphere and any other suitable form. In various other aspects, the optical resonators may be constructed from any suitable material including but not limited to, silicon, silica, lithium niobite, and any other suitable materials without limitation.

g. Sensor Packaging Method

In various aspects, the optical WGM resonator-based acoustic sensor is characterized as having a submillimeter-level footprint, enabling the formation of compact sensor arrays. In some aspects, the on-chip design of the optical WGM resonator-based acoustic sensor could be used to construct 1D or 2D sensor arrays with a period as small as 0.3 mm.

In one aspect, the WGM resonators described herein may be fabricated on a commercial silicon wafer using any suitable existing fabrication method without limitation. In another aspect, the cost of the sensors could be greatly reduced due to the compatibility of suitable fabrication methods to current semiconductor industry manufacturing systems and methods.

Figure 13A:
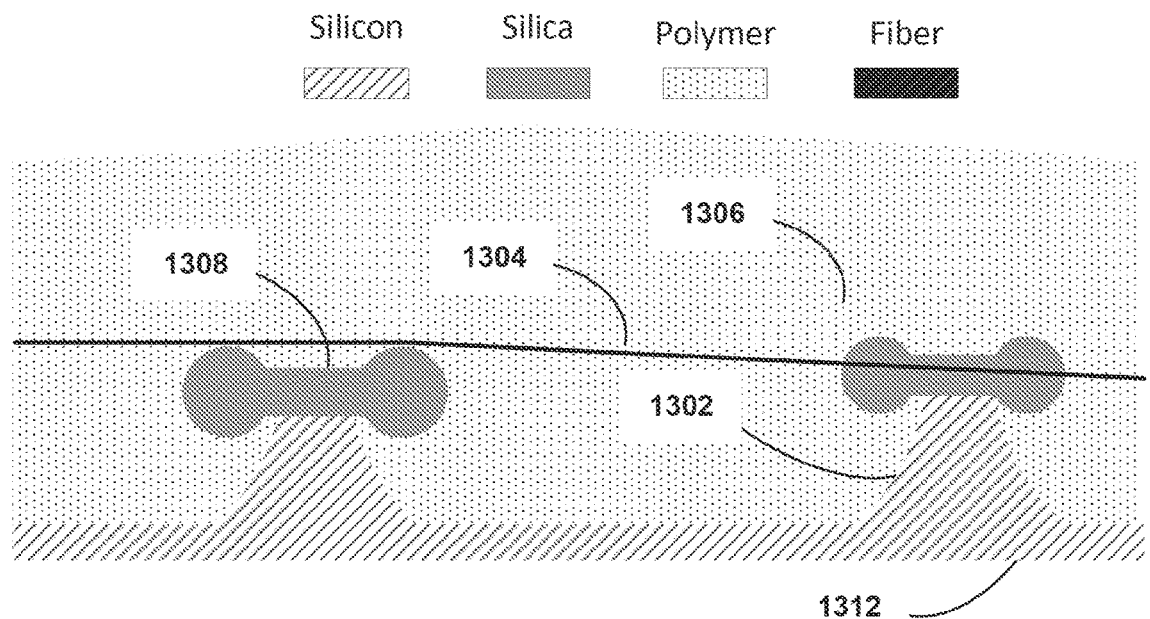
FIG. 13A is a schematic side view illustrating a method of assembling a acoustic sensor in accordance with one aspect of the disclosure.
Figure 13B:
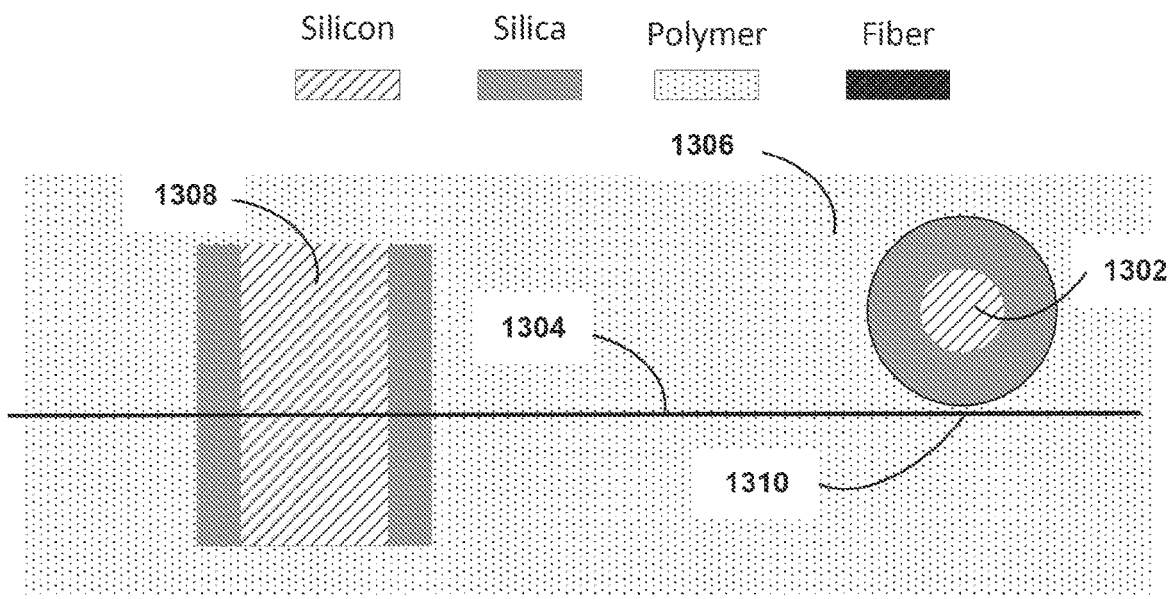
FIG. 13B is a schematic top view illustrating a method of assembling a acoustic sensor in accordance with one aspect of the disclosure.

By way of non-limiting example, shown illustrated in FIGS. 13A and 13B, microtoroid resonators 1302 are fabricated on a substrate 1312 with an engineered mechanical spectrum and supporting walls on the side. Tapered fibers 1304 with optimal diameter are fabricated and positioned within the encapsulating polymer 1306 to couple the tapered fiber 1304 with a microtoroid 1302. In one aspect, a fiber guide 1308 is fabricated on the substrate 1312 to facilitate the positioning of the tapered fiber 1304 adjacent to the microtoroid 1302. In this aspect, the substrate 1312 may be coupled to an adjustable platform including, but not limited to a microstage or micromanipulator configured to move the platform and attached fiber guide 1308 and microtoroid 1302 relative to the tapered fiber 1304.

Figure 14:
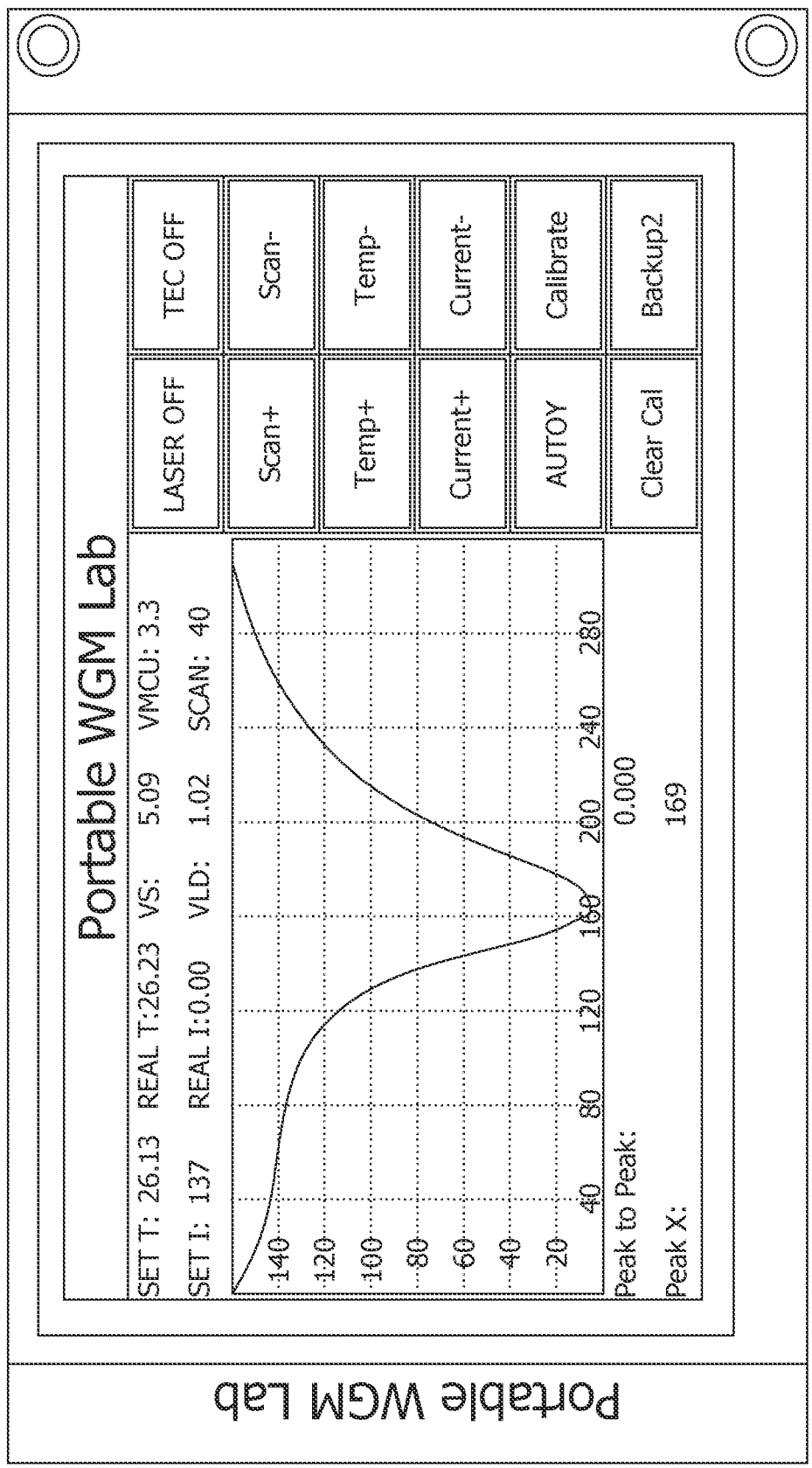
FIG. 14 is screen shot illustrating the display of a portable device for obtaining transmission readings from an optical acoustic sensor in accordance with one aspect of the disclosure.

In this aspect, the microtoroid 1302 and fiber 1304 are covered with a UV-curable low-index polymer as illustrated in FIGS. 13A and 13B. The polymer-covered microtoroid 1302 and fiber guide 1308 are then moved to tune to the optimal coupling gap in polymer by adjusting the gap 1310 between the microtoroid 1302 and fiber 1304. In one aspect, the optimal tuning gap may be identified by iteratively obtaining transmission spectra using a computing device as illustrated in FIG. 14 for different gap distances. Once the microtoroid 1302 and fiber 1304 are positioned at the desired gap as described above, the low-index polymer is exposed directly to UV light and the real-time transmission spectrum is monitored as illustrated in FIG. 14 until an indication of the curing of coupling region is detected. In one aspect, the indication of the curing of coupling region includes a fast shift of optical resonance in the transmission spectra. In another aspect, the entire sensor device may be covered with a plastic film to establish an inert environment for UV curing the polymer layer. Within this inert environment, the entire encapsulation polymer layer may be cured in this aspect.

In one aspect, the driving system of the optical resonators, illustrated in FIG. 14, may be provided as a phone-sized system. This phone-sized system may be used to assess device performance while positioning the fiber and microtoroid, as well as to operate the pressure sensor in a variety of devices as described herein.

II. Imaging Systems

In various aspects, the optical-resonator-based acoustic sensors described above simultaneously achieve high sensitivity and broad bandwidth at levels unprecedented for previous acoustic sensor configurations. In some aspects, at least one optical-resonator-based acoustic sensor could serve as an acoustic detector in a clinical imaging system, including, but not limited to, an ultrasound acoustic imaging system, a photothermal imaging system, and any other suitable clinical imaging system that includes the detection of acoustic signals.

a. Ultrasound Imaging Systems

Figure 15:
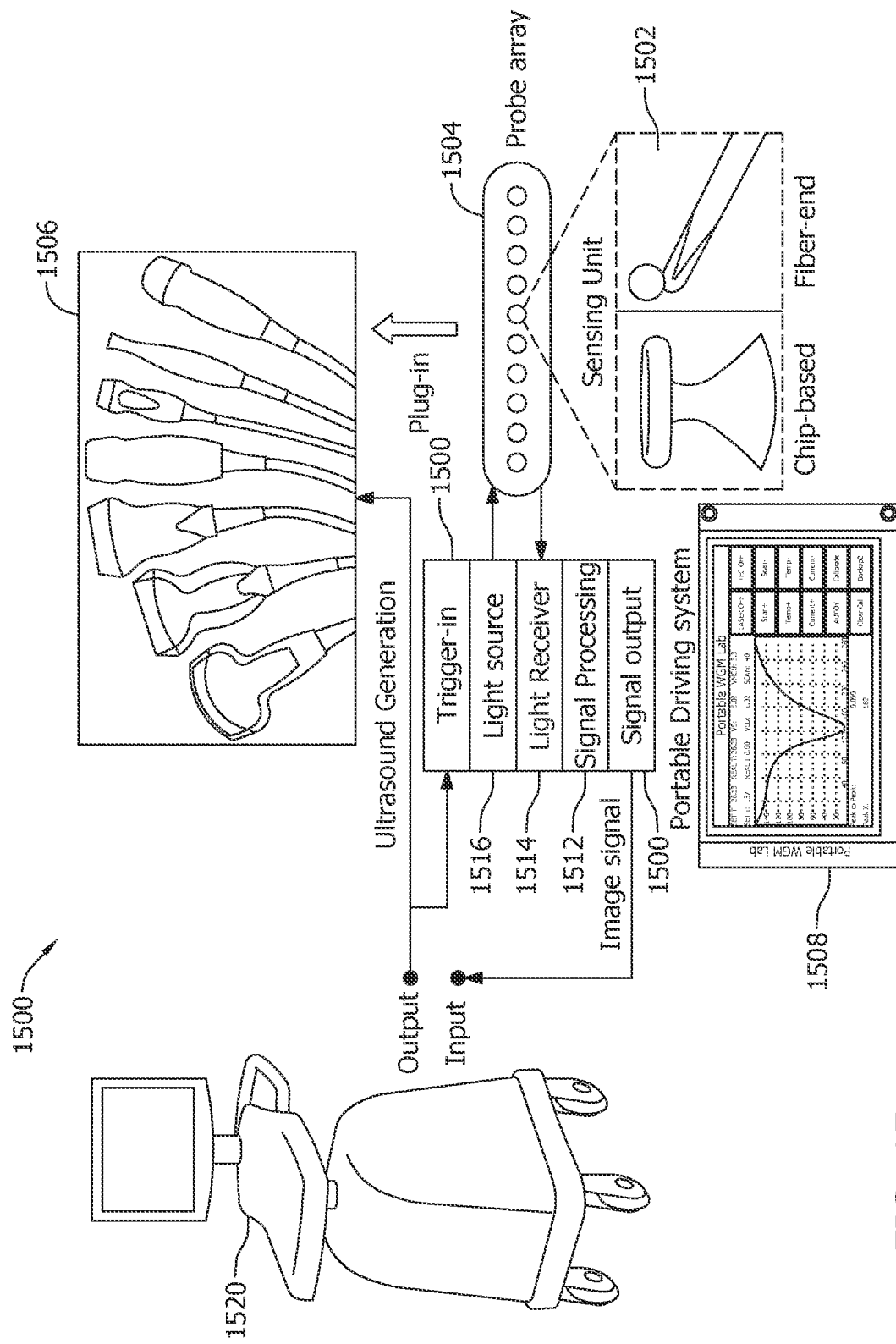
FIG. 15 is a schematic illustration showing the elements of an ultrasound imaging system that includes an optical-resonator-based acoustic sensor in accordance with one aspect of the disclosure.

In one aspect, the optical-resonator-based acoustic sensors are incorporated into an ultrasound imaging system 1500, as illustrated in FIG. 15. In this aspect, an optical-resonator-based acoustic sensor 1502 replaces existing piezoelectric transducers for detecting ultrasound in a probe array 1504, while retaining the piezoelectric transducers within the ultrasound probe head 1506 for generating the US pulses that are scattered, reflected, or otherwise altered by the imaged tissues. With the enhanced sensitivity and expanded bandwidth relative to conventional devices such as piezoelectric sensors, the optical-resonator-based acoustic sensor 1502 collects sufficient information for image reconstruction even from strongly attenuated ultrasound signal at high frequency. Consequently, the incorporation of the optical-resonator-based acoustic sensor 1502 could help to overcome the tradeoff between resolution (frequency determined) and the penetration depth for the current clinical ultrasound systems.

In various aspects, the ultrasound imaging system makes of ultrasound waves of any frequency above about 20 kHz without limitation. As described above, the whisper gallery mode microresonators may be configured to detect a wide range of acoustic frequencies. In some aspects, the ultrasound imaging system makes use of waves with frequencies ranging from about 20 kHz to about 200 MHz or higher. In other aspects, the ultrasound imaging system makes use of waves with frequencies ranging from about 20 kHz to about 200 MHz or higher including, but not limited, to a range of about 2 MHz to about 20 MHz as is used in existing ultrasound imaging systems, ultrahigh frequency ultrasound ranging from about 100 MHz to about 300 MHz, and any other suitable ultrasound frequency. By enabling the usage of high frequency ultrasound for applications with a deep penetration requirement, the disclosed optical-resonator-based ultrasound detector could greatly increase the resolution of ultrasound imaging.

Referring again to FIG. 15, the ultrasound signal is transmitted from a conventional transducer 1506, while the echo signal is collected by the optical-resonator-based ultrasound sensors 1502 in a probe array 1504. A portable optical controlling module 1508 is utilized to drive the optical sensors 1502 in the probe array 1504 to detect ultrasound signals produced by a tissue to be imaged in response to ultrasound pulses produced by the conventional transducer 1506. The optical controlling module 1508 is operatively coupled to each optical-resonator-based ultrasound sensor 1502 in the probe array 1504. In addition, the optical controlling module 1508 is operatively coupled to an imaging control and analysis system 1520 configured to operate the conventional transducer 1506, to receive signals from the probe array 1504, and to reconstruct an ultrasound image based on the signals received from the probe array 1504.

Referring again to FIG. 15, the optical controlling module 1508 includes a light source 1516 and a light receiver 1514 operatively coupled to the optical-resonator-based ultrasound sensors 1502 of the probe array 1504. The light source 1516 produces light that is directed into at least one coupling waveguide (not illustrated) used to couple light into the optical-resonator-based ultrasound sensors 1502. The light receiver 1514 includes at least one light detector (not illustrated) configured to detect light received from the at least one coupling waveguide as modulated by the optical-resonator-based ultrasound sensors 1502. The optical controlling module 1508 further includes a signal processing module 1512 configured to transform the output of the at least one light detector of the light receiver 1514 into electrical signals encoding the light detector output. The electrical signals produced by the signal processing module 1512 are communicated to the signal outputs 1510 of the probe array 1504 produced in response to detected ultrasound signals from the tissues to the imaging control and analysis system 1520.

In various aspects, the probe array 1504 includes at least one optical-resonator-based ultrasound sensor 1502. In some aspects, the probe array 1504 includes a plurality of optical-resonator-based ultrasound sensors 1502 arranged in an array pattern including, but not limited to, a 1D linear array pattern and a 2D array pattern. The 2D array pattern includes any suitable 2D array pattern without limitation. Non-limiting examples of suitable 2D array patterns include Cartesian grid patterns, circular patterns such as a single circle of sensors or multiple concentric circles of sensors, and any combination thereof. In one aspect, the probe array 1504 is a 1D linear array that includes a plurality of sensors 1502, as illustrated in FIG. 15. All sensors of the probe array are encapsulated in a continuous low-index polymer layer as described above.

In various aspects, the spacing between adjacent sensors 1502 within the sensor array 1504 may be uniform or the spacings may vary between different adjacent sensors 1502. The spacings between sensors 1502 within the probe array 1504 may be selected based on any one or more of at least several factors including, but not limited to, the desired spatial resolution of the imaging system, the dimensions of the WGM resonators and coupling waveguides, the architecture of sensor array, the avoidance of cross-talk between adjacent sensors, and any other relevant factors without limitation. In some aspects, the minimal separation between adjacent sensors 1502 within the probe array 1504 is at least five μm to avoid cross-talk of the sensors 1502.

In various additional aspects, the sensors of the sensor array have essentially equal dimensions. In other aspects, at least a portion of the sensors 1502 may have different dimensions. Without being limited to any particular theory, a range of sensor sizes may provide the sensor array with enhanced sensitivity to acoustic signals over a variety of frequency ranges.

In various additional aspects, each sensor 1502 of the probe array 1504 may be coupled to separate coupling waveguides, such that the number of sensors 1502 is equal to the number of coupling waveguides. In other additional aspects, at least a portion of the sensors may share coupling to a shared coupling waveguide. In some additional aspects, the probe array may include one or more shared coupling waveguides shared by one or more portions of the sensors as well as an additional portion of the sensors each coupled to separate coupling wave-guides.

Figure 5:
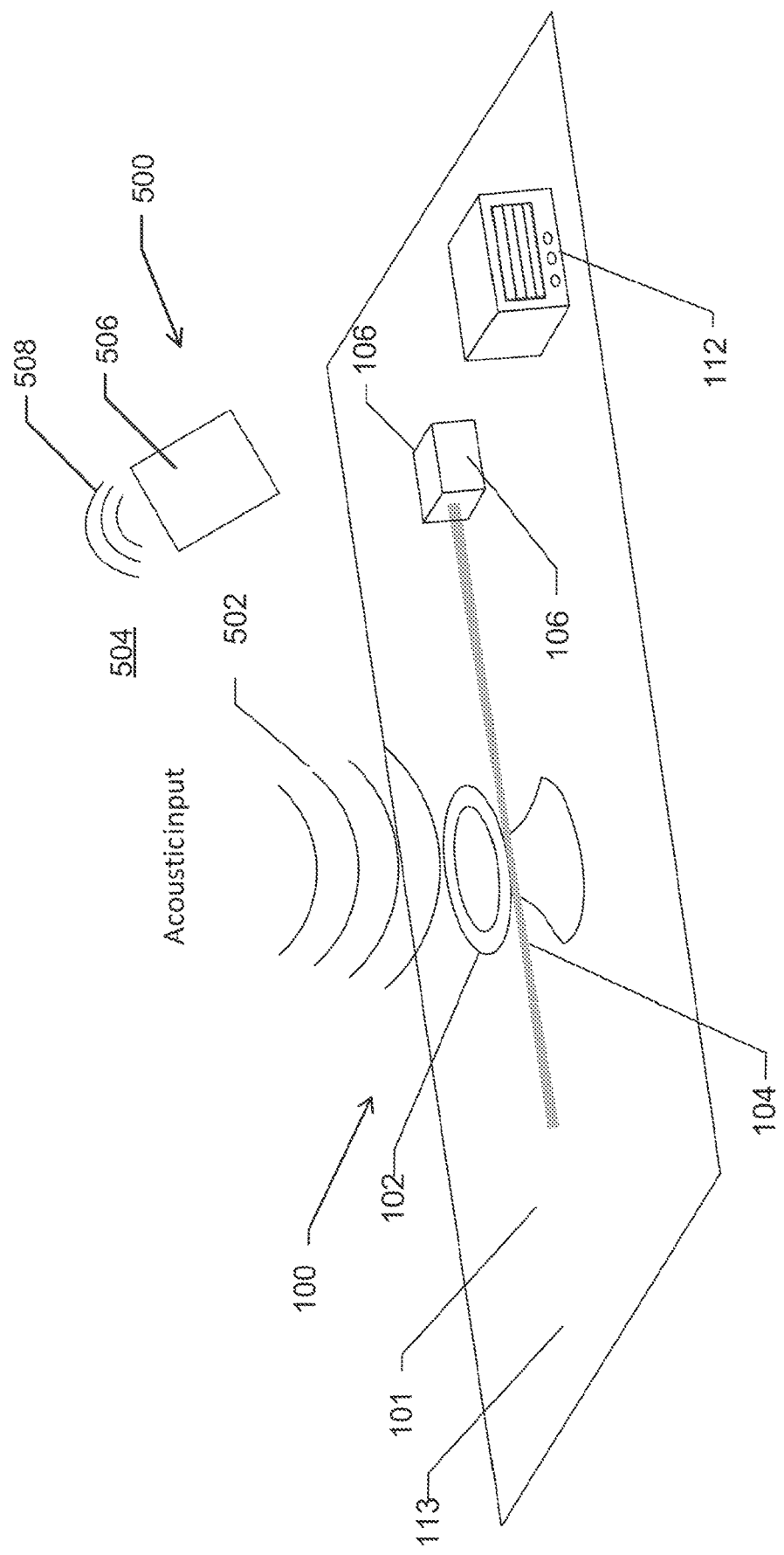
FIG. 5 is an illustration of an acoustic imaging system that includes an optical-resonator-based acoustic sensing probe in accordance with one aspect of the disclosure.
Figure 7:
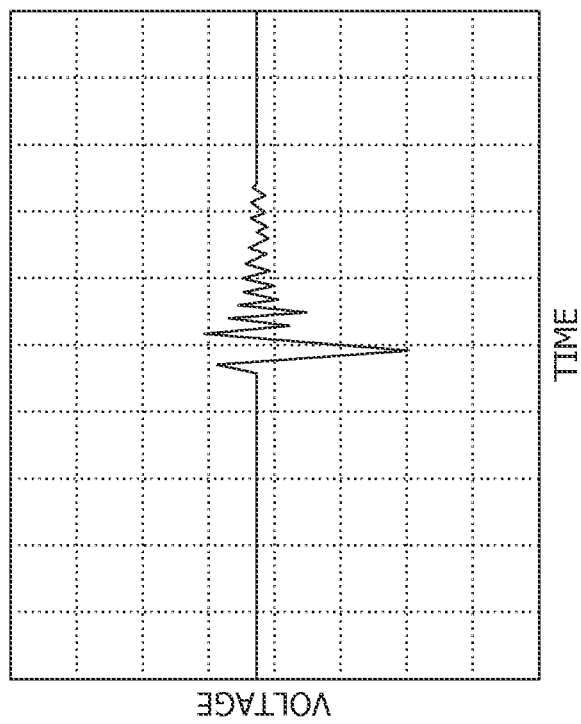
FIG. 7 is a graph illustrating an example of a signal generated by the optical-resonator-based acoustic sensing probe in response to an ultrasound pulse.

FIG. 5 is a schematic illustration showing the introduction of ultrasound. pulses into a tissue and the detection of ultrasound signals produced by the tissue using an optical-resonator-based acoustic sensor system 100 within an ultrasound imaging system 500 similar to the system 1500 illustrated in FIG. 15. Referring to FIG. 5, at least one WGM micro-resonator 102 and coupled waveguide 104 of the acoustic sensor system 100 may be acoustically coupled to a tissue 504 to be imaged. A conventional ultrasound, transducer 506 directs ultrasound pulses 508 into the tissue 504 to induce an acoustic signal 502. In one aspect, light coupled, into the WGM micro-resonator 102 is produced using a laser 101 directed through a polarization controller (not illustrated). Acoustic signals 502 interact with the WGM micro-resonator 102 as described above and are detected in the form of changes in the laser signal detected by a light detector 106 coupled to an output port 108 of the coupled waveguide 104. The output signals of the light detector 106 are communicated to a computing device 112 functioning as a signal analyzer. In one aspect, the computing device 122 transforms the output signals of the light detector 106 into acoustic signals in the form of optical resonance amplitudes of the micro-resonator, as illustrated in FIG. 7. In another aspect, the computing device 112 transforms the output signals of the light detector 106 into acoustic signals in the form of may obtain a the acoustic signal may be obtained using a resonant wavelength identified from a spectral response of the micro-resonator 600, as illustrated in FIG. 6.

In some aspects, the ultrasound imaging system is provided with a single optical-resonator-based acoustic sensor system. In this aspect, a focused ultrasound source is applied to transmit an ultrasound wave, while the single optical-resonator-based acoustic sensor system collects the echo and locates the depths of reflectors (A-scan image). A B-scan image is acquired by mechanically scanning the bounded source and the sensor.

In other aspects, the ultrasound imaging system is provided with an array of optical-resonator-based acoustic sensors, as illustrated in FIG. 15. In this aspect, the focusing and scanning of the ultrasound is achieved by a transducer phase array. In some aspects, a real-time B-scan image may be acquired by applying a suitable beam-forming algorithm to the collected signal group of the optical sensors. In another aspect, tilted plane-wave ultrasound may be transmitted by a transducer phase array and the transmitting angle could be scanned. The reflection signal may be collected by the optical-resonator-based acoustic sensor array. With a suitable beam-forming algorithm, ultra-fast B-scan image acquisition may be achieved.

In various aspects, an array of optical-resonator-based acoustic sensors includes at least two WGM resonators arranged in a spatial array including, but not limited to, one of a linear array, a 2D array such as a planar array or a ring array, and a 3D array such as a cylindrical or hemi-spherical array. In some aspects, the at least two WGM resonators in an array are each coupled to separate coupling fibers, light sources, and light detectors. In other aspects, at least two WGM resonators in the array are coupled to the same coupling fiber, light source, and light detector.

In other additional aspects, the at least two WGM resonator-based pressure sensor systems in the array are essentially identical with respect to size, central frequency, operating wavelength, sensitivity, and any other relevant operational parameter. In yet other additional aspects, at least two WGM resonator-based pressure sensor systems may differ in one or more parameter including, but not limited to, resonator diameter, resonator material, gap separation distance, operating wavelength, encasement polymer material, coupling taper material, coupling taper diameter, and any other relevant parameter.

In an additional aspect, the optical-resonator-based acoustic sensor system may be incorporated, into existing ultrasound imaging systems to enhance the quality of harmonic ultrasound imaging. Harmonic ultrasound imaging enjoys high sensitivity and specificity due to the high-frequency nonlinear ultrasound echo from the imaged target. However, the weak and broadband nature of the nonlinear signal imposes a challenging requirement for the ultrasound detector. The optical-resonator-based acoustic sensor could be employed to (1) efficiently collect the nonlinear ultrasound echo; (2) allow a sufficiently broad detecting band to enable pumping ultrasound at higher frequency and short pulse duration (for higher resolution).

b. Photoacoustic Imaging Systems

In various aspects, the optical-resonator-based acoustic sensors are incorporated into an ultrasound imaging system. Without being limited to any particular theory, at least one light pulse is introduced into a tissue to be imaged, and the energy of incident photons absorbed by structures within the tissue and re-emitted photoacoustic signals in the form of ultrasonic waves. The emitted ultrasonic waves are subsequently detected by at least one ultrasound transducer and the detected signals are used to reconstruct the photoacoustic images. In various aspects, optical-resonator-based acoustic sensors configured to detect photoacoustic signals are compatible with any existing ultrasound imaging system without limitation. Non-limiting examples of ultrasound systems compatible with optical-resonator-based acoustic sensors include photoacoustic microscopy (PAM) systems and computed tomography (PACT) systems.

Figure 26:
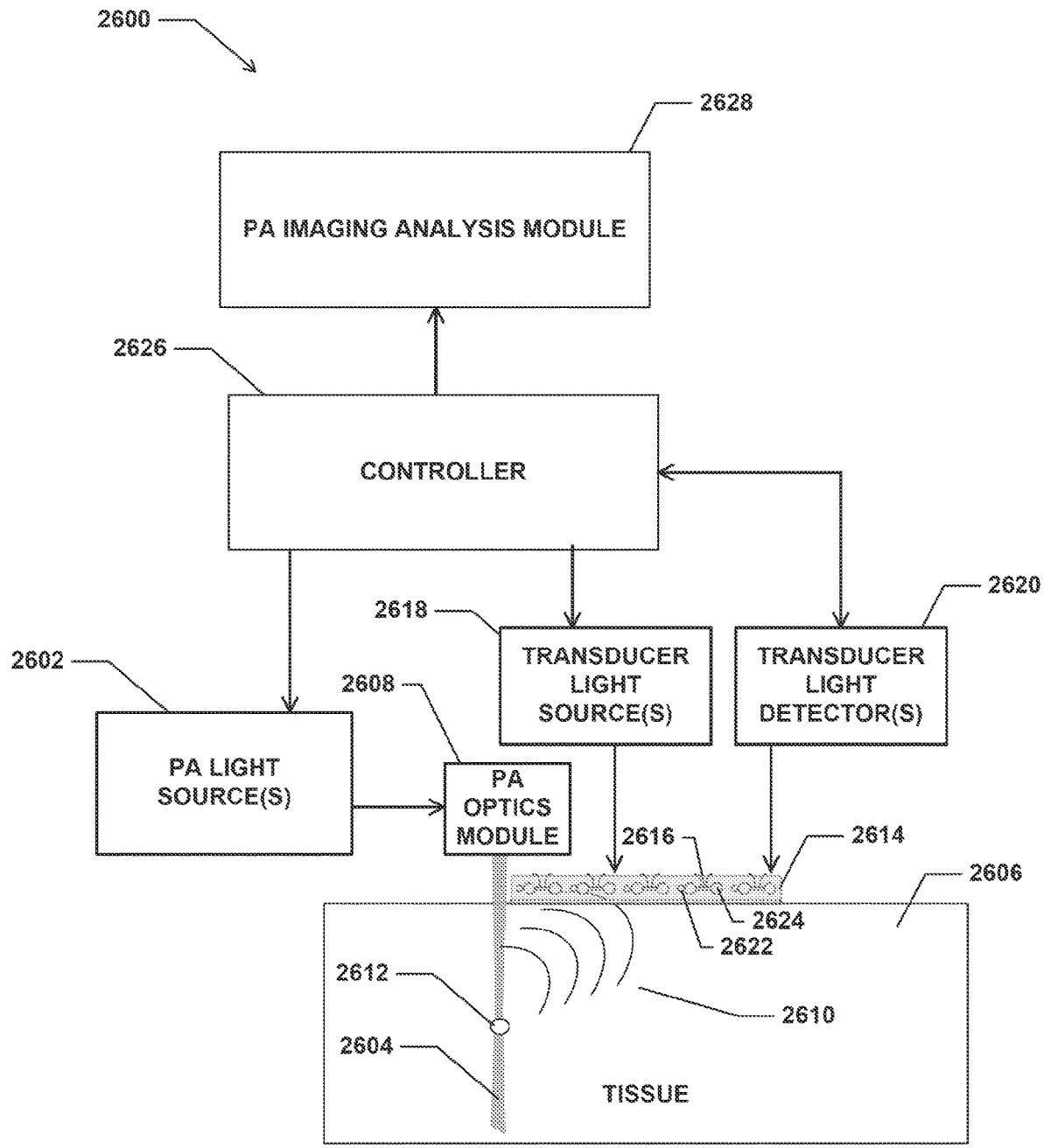
FIG. 26 is a schematic illustration of a photoacoustic imaging system in accordance with one aspect of the disclosure.

Referring to FIG. 26, the photoacoustic system 2600 in one aspect includes a photoacoustic (PA) light source 2602 including, but not limited to, at least one pulsed laser configured to produce a plurality of laser pulses 2604 to be directed into a tissue 2606 using at least one optical element of a PA optics module 2608. In an aspect, each laser pulse 2604 produced by the PA light source 2602 is configured to induce a plurality of PA signals 2610 from structures 2612 within the portion of the tissue 2606 to which the laser pulse 2604 is directed. As described herein above, the plurality of PA signals 2610 induced by the single laser pulse 2604 are detected by a transducer array 2614 and reconstructed into a PA image (not illustrated) using any suitable reconstruction method known in the art.

Referring again to FIG. 26, in one aspect the PA signals 2610, which include a plurality of ultrasound waves, are collected by at least one optical-resonator-based ultrasound sensor 2616 in the transducer array 2614. Any suitable optical sensor described herein may be incorporated as an optical-resonator-based ultrasound sensor 2616 in the transducer array 2614 without limitation. As illustrated in FIG. 26, the photoacoustic system 2600 further includes at least one transducer light source 2618 and at least one transducer light detector 2620 operatively coupled to the optical-resonator-based ultrasound sensors 2616 of the transducer array 2614. The light source 2618 produces light that is directed into at least one coupling waveguide 2622 used to couple light into the optical-resonator-based ultrasound sensors 2616. The transducer light detector 2620 includes at least one light detector (not illustrated) configured to detect light received from the at least one coupling waveguide 2622 as modulated by the WGM resonator 2624 of the optical-resonator-based ultrasound sensor 2616.

A controller 2626 is utilized to drive the optical sensors 2616 in the transducer array 2614 to detect the PA signals 2610 produced by the tissue 2606 in response to laser pulses 2604 produced by the PA light source 2602. The controller 2626 is operatively coupled to each optical-resonator-based ultrasound sensor 2616 in the transducer array 2614 via the transducer light sources 2618 and the transducer light detectors 2620. In some aspects, the controller may include a signal processing module (not illustrated) configured to transform the output of the at least one transducer light detectors 2620 into electrical signals encoding the detector outputs. In addition, the controller 2626 is operatively coupled to a PA imaging analysis module 2628 configured to reconstruct an ultrasound image based on the signals received from the transducer array 2614. In some aspects, the controller 2626 may be provided in the form of an optical controlling module similar to the portable driving system described above and illustrated in FIG. 14 and FIG. 25.

In various aspects, each of the at least one pulse lasers of the PA light source 2602 may produce a plurality of laser pulses at a pulse wavelength. The pulse wavelength may be selected based on any one or more of at least several factors including, but not limited to, enhanced penetration of the particular tissue to be imaged by the pulse wavelength, enhanced contrast of structures of interest with respect to surrounding structures, as may be useful in non-labeled visualization of circulating tumor cells, and enhanced contrast of exogenous structures of interest as may be useful in SIP-PACT imaging of the perfusion of contrast agents such as NIR dyes. In one aspect, a pulse wavelength ranging from about 650 nm to about 1350 nm may be selected to maximize optical penetration through a whole body of a mammal to be imaged, as this wavelength range is to encompass pulse wavelengths that are less attenuated within mammalian tissues relative to wavelengths falling outside of this "optical window". In one particular aspect, a pulse wavelength of about 1064 nm may be selected to enable PA imaging in mammalian tissues using the PA imaging system 2600.

In various aspects, the PA light source 2602 may produce laser pulses at a single wavelength, at two (dual) wavelengths, or at three or more (multiple) wavelengths as needed. In various aspects, the plurality of laser pulses may be produced at one or more wavelengths within a range of from approximately 650 nm to approximately 1350 nm, thereby enabling maximal optical penetration for whole-body imaging of animal subjects. Without being limited to any particular theory, this wavelength range is characterized by enhanced penetration through biological tissues; for example, this wavelength range is previously known to correspond to pulse wavelengths where mammalian tissues least attenuate light.

In various other aspects, the PA imaging system 2600 may make use of a single pulse wavelength selected for enhanced penetration of a particular tissue to be imaged, and/or enhanced contrast of structures of interest with respect to surrounding structures. In another aspect, the PA imaging system 2600 may make use of dual and/or multiple pulse wavelengths to enable functional imaging including, but not limited to determining oxygen saturation within blood and other tissues. For example, a first pulse wavelength may be selected to enable maximum contrast for oxy-hemoglobin, and a second pulse wavelength may be selected to enable maximum contrast for deoxy-hemoglobin or, alternatively, enable maximum contrast for all hemoglobin. Dual/multiple pulse wavelengths may also be selected for enhanced contrast of different structures, such as blood cells, CTCs, white blood cells, contrast agents such as NIR dyes, or enhanced contrast of exogenous structures of interest (i.e. perfusion of contrast agents such as NIR dyes). In various aspects, the PA imaging system 2600 may include a pulsed laser producing laser pulses at a single pulse wavelength including, but not limited to: a 720 nm laser such as a LS-2145-LT-150 Ti-sapphire (Ti-Sa) pulsed laser (Symphotic Tii) with 20 Hz repetition rate and 12 ns pulse width; a 1064 nm laser such as a DLS9050 pulsed laser (Continuum) with a 50 Hz repetition rate and a pulse width ranging from about 5 ns to about 9 ns; and any other suitable pulsed laser.

In various aspects, the PA optics module 2608 of the PA imaging system 2600 include one or more optical elements configured to direct the plurality of laser pulses produced by the PA light source 2602 into a tissue 2606 to be imaged. In some aspects, the focal region of the ultrasound transducer array 2614 coincides with at least a portion of the tissue to be imaged that is illuminated by the laser pulses 2604, so that PA signals 2610 induced by the plurality of laser pulses 2604 are detected by the transducer array 2614 and used to reconstruct one or more PA images.

In various aspects, the one or more optical elements (not illustrated) of the PA optics module 2608 are operatively coupled to the PA light source 2602 in order to receive the plurality of laser pulses produced by at least one pulsed laser. Further, the one or more optical elements are configured to perform various transformations of the plurality of laser pulses including, but not limited to: altering the direction of travel of each laser pulse; redistributing the distribution of light energy across a cross-sectional area of each laser pulse into an essentially uniform spatial distribution of light energy; altering the cross-sectional size and/or shape of each laser pulse; modulating the light intensity or fluence of each laser pulse; modulating the relative time of arrival of two different laser pulses produced by two corresponding pulsed lasers, selectively transmitting or blocking transmission of laser pulses from one or more pulsed lasers, and any other suitable transformation of the plurality of laser pulses.

Non-limiting examples of suitable optical elements suitable for incorporation into the PA optics module 2608 of the PA imaging system 2600 include one or more of prisms, mirrors, diffusers, condensers, lenses, beam splitters, beam combiners, optic fibers, wave-guides, and any other known optical element suitable for modifying one or more characteristics of the laser pulse. Non-limiting examples of characteristics of a laser pulse that may be modified and/or modulated using one or more optical elements include: cross-sectional profile, cross-sectional dimensions, direction of travel, wave speed, wave length, polarization, intensity, phase, wavefront shape, superposition with other laser pulses, cross-sectional energy homogeneity, pulse width, delay with respect to other laser pulses in a pulse series, and any other relevant characteristics of a laser pulse.

In an aspect, a diffuser may be configured to homogenize a laser pulse profile so that the energy intensity is distributed uniformly across a cross-sectional area of a laser pulse. Non-limiting examples of suitable diffusers include various engineered diffusers such as ring diffusers. In one aspect, the diffuser may be a commercially available engineered diffuser including, but not limited to, an EDC-10-A-1r (RPC Photonics). Non-limiting examples of suitable condensers include various customized condensers, such as a customized ring condenser. Non-limiting examples of suitable prisms include triangular prisms, rhomboidal prisms, and any other suitable prism. Non-limiting examples of suitable lenses include convex lenses, concave lenses, cylindrical lenses, half-cylinder lenses, compound lenses, and any other suitable lens. In another aspect, the lens may be a commercially available lens including, but not limited to, an AX-FS-1-140-0 conical lens (Del Mar Photonics). Non-limiting examples of suitable mirrors include planar mirrors, convex mirrors, and concave mirrors.

In various aspects, the one or more optical elements may be further configured to enable an illumination approach selected according to the region or tissue to be imaged and/or the type of imaging to be conducted using the PA imaging system 2600. In one aspect, the one or more optical elements may be configured to enable a top illumination approach (see FIG. 26) or a side illumination approach. The selection of specific optical elements incorporated into the PA imaging system 2600 may be influenced at least in part by the illumination approach to be used by the PA imaging system 2600.

III. Computing Systems and Devices

Figure 8:
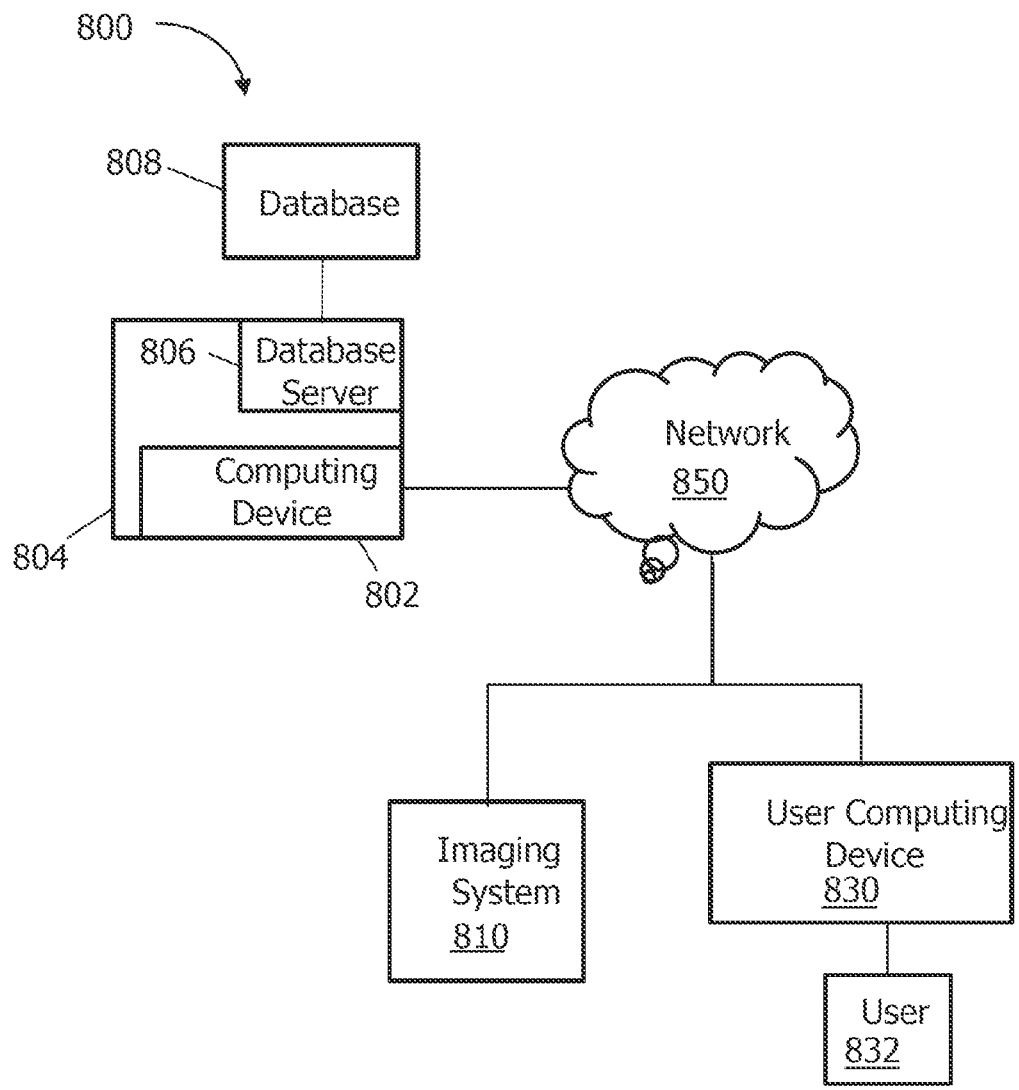
FIG. 8 is a block diagram schematically illustrating a system in accordance with one aspect of the disclosure.

FIG. 8 depicts a simplified block diagram of a computing device 800 for implementing the methods described herein. As illustrated in FIG. 8, the computing device 800 may be configured to implement at least a portion of the tasks associated with disclosed method using the disclosed optical-resonator-based pressure sensor system. The computer system 800 may include a computing device 802. In one aspect, the computing device 802 is part of a server system 804, which also includes a database server 806. The computing device 802 is in communication with a database 808 through the database server 806. The computing device 802 is communicably coupled to the system 810 and a user computing device 830 through a network 850. The network 850 may be any network that allows local area or wide area communication between the devices. For example, the network 850 may allow communicative coupling to the Internet through at least one of many interfaces including, but not limited to, at least one of a network, such as the Internet, a local area network (LAN), a wide area network (WAN), an integrated services digital network (ISDN), a dial-up-connection, a digital subscriber line (DSL), a cellular phone connection, and a cable modem. The user computing device 830 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

Figure 9:
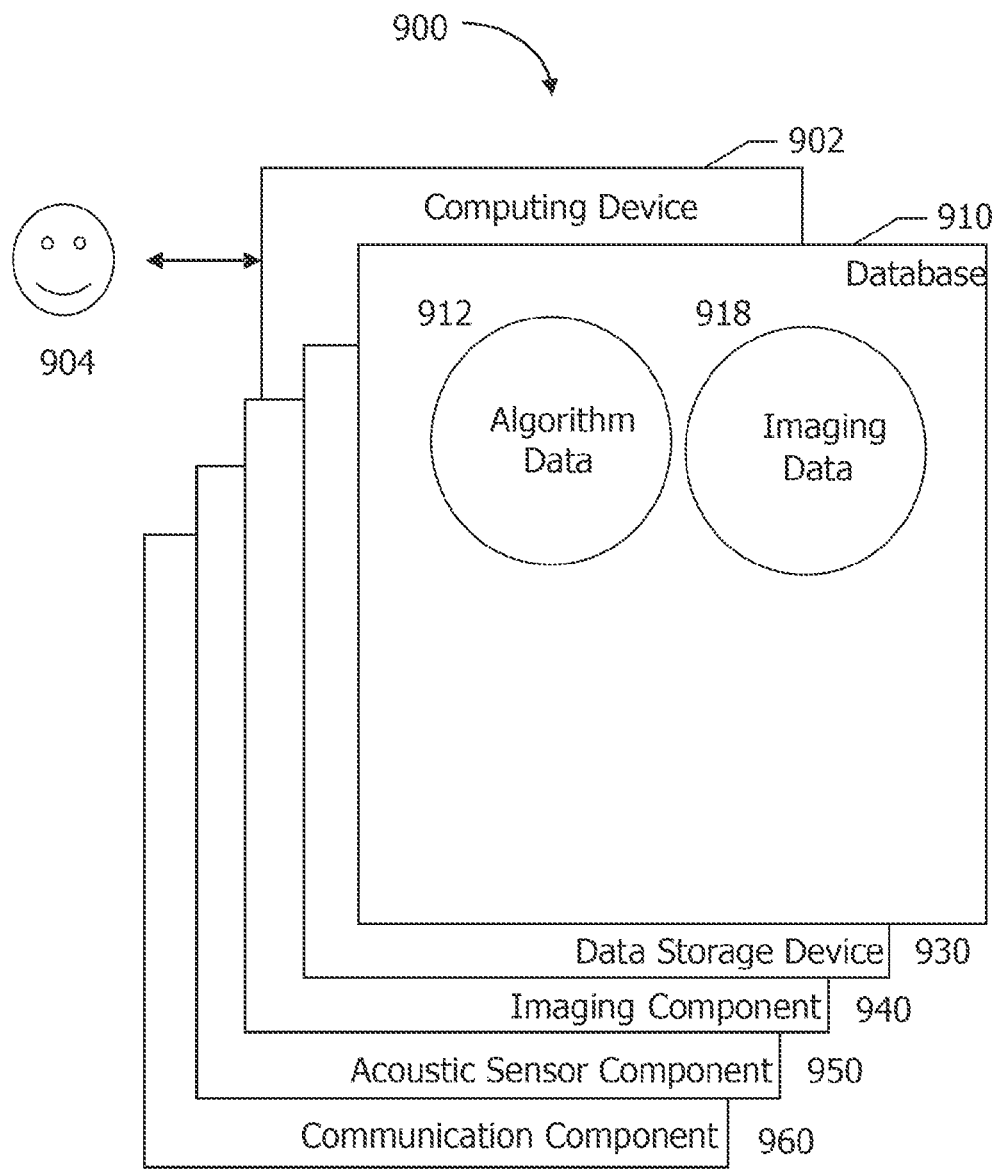
FIG. 9 is a block diagram schematically illustrating a computing device in accordance with one aspect of the disclosure.

In other aspects, the computing device 802 is configured to perform a plurality of tasks associated with the operation of an optical-resonator-based acoustic sensor and/or an imaging system incorporating the optical-resonator-based acoustic sensor including, but not limited to the ultrasound (US) and photoacoustic (PA) imaging systems described above. FIG. 9 depicts a component configuration 900 of computing device 902, which includes database 910 along with other related computing components. In some aspects, computing device 902 is similar to computing device 802 (shown in FIG. 8). A user 904 may access components of computing device 902. In some aspects, database 910 is similar to database 808 (shown in FIG. 8).

In one aspect, database 910 includes imaging data 918 and algorithm data 912. Non-limiting examples of suitable imaging data 918 may include medical imaging data including, but not limited to, ultrasound imaging data or photoacoustic imaging data. Non-limiting examples of suitable algorithm data 912 include any values of parameters defining the operation of the optical WGM resonator-based acoustic sensors, ultrasound imaging systems, and photoacoustic imaging systems. Non-limiting examples of suitable algorithm data 912 includes any values of parameters defining the algorithms associated with the disclosed method as described herein and or any image reconstruction algorithms used to reconstruct the ultrasound or photoacoustic images as described above.

Computing device 902 also includes a number of components that perform specific tasks. In the example aspect, computing device 902 includes data storage device 930, imaging component 940, acoustic sensor component 950, and communication component 960. Data storage device 930 is configured to store data received or generated by computing device 902, such as any of the data stored in database 910 or any outputs of processes implemented by any component of computing device 902.

Communication component 960 is configured to enable communications between computing device 902 and other devices (e.g. user computing device 830 and system 810, shown in FIG. 8) over a network, such as network 850 (shown in FIG. 8), or a plurality of network connections using predefined network protocols such as TCP/IP (Transmission Control Protocol/Internet Protocol).

Figure 10:
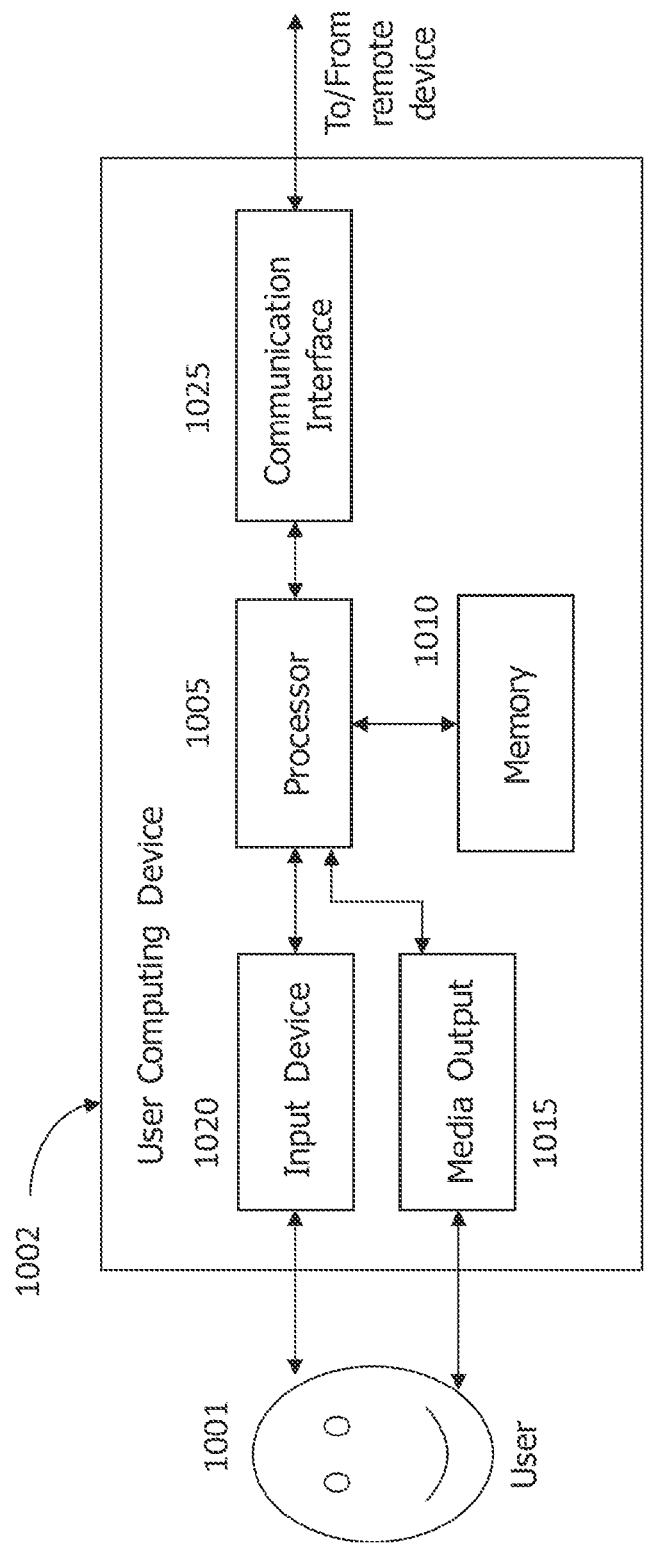
FIG. 10 is a block diagram schematically illustrating a remote or user computing device in accordance with one aspect of the disclosure.

FIG. 10 depicts a configuration of a remote or user computing device 1002, such as user computing device 830 (shown in FIG. 8). Computing device 1002 may include a processor 1005 for executing instructions. In some aspects, executable instructions may be stored in a memory area 1010. Processor 1005 may include one or more processing units (e.g., in a multi-core configuration). Memory area 1010 may be any device allowing information such as executable instructions and/or other data to be stored and retrieved. Memory area 1010 may include one or more computer-readable media.

Computing device 1002 may also include at least one media output component 1015 for presenting information to a user 1001. Media output component 1015 may be any component capable of conveying information to user 1001. In some aspects, media output component 1015 may include an output adapter, such as a video adapter and/or an audio adapter. An output adapter may be operatively coupled to processor 1005 and operatively coupled to an output device such as a display device (e.g., a liquid crystal display (LCD), organic light emitting diode (OLED) display, cathode ray tube (CRT), or "electronic ink" display) or an audio output device (e.g., a speaker or headphones). In some aspects, media output component 1015 may be configured to present an interactive user interface (e.g., a web browser or client application) to user 1001.

In some aspects, computing device 1002 may include an input device 1020 for receiving input from user 1001. Input device 1020 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 1015 and input device 1020.

Computing device 1002 may also include a communication interface 1025, which may be communicatively coupled to a remote device. Communication interface 1025 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 1010 are, for example, computer-readable instructions for providing a user interface to user 1001 via media output component 1015 and, optionally, receiving and processing input from input device 1020. A user interface may include, among other possibilities, a web browser and client application. Web browsers enable users 1001 to display and interact with media and other information typically embedded on a web page or a website from a web server. A client application allows users 1001 to interact with a server application associated with, for example, a vendor or business.

Figure 11:
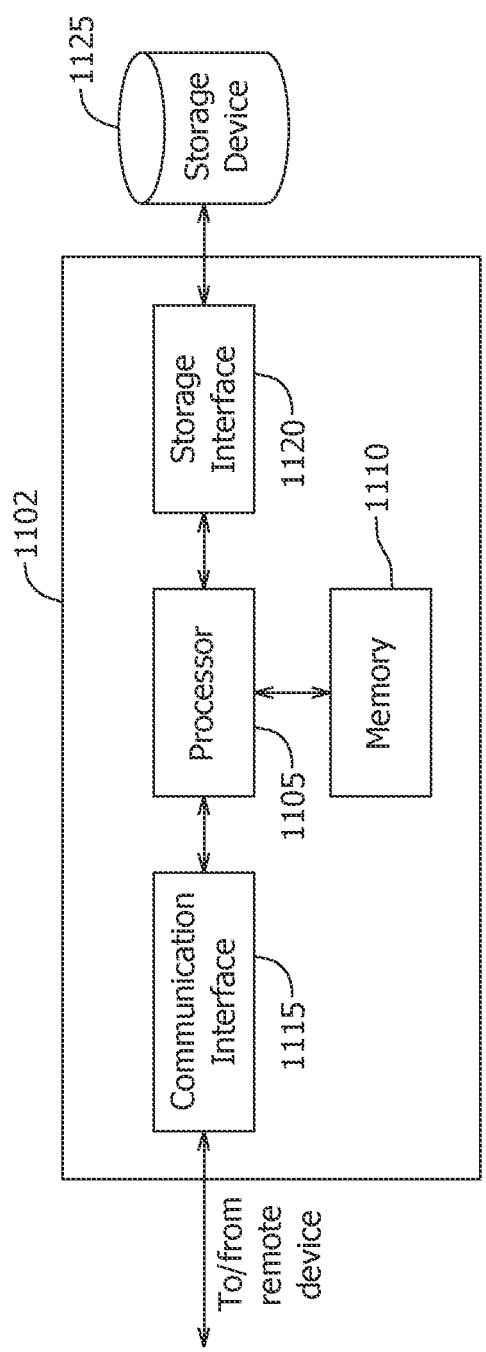
FIG. 11 is a block diagram schematically illustrating a server system in accordance with one aspect of the disclosure.

FIG. 11 illustrates an example configuration of a server system 1102. Server system 1102 may include, but is not limited to, database server 806 and computing device 802 (both shown in FIG. 8). In some aspects, server system 1102 is similar to server system 804 (shown in FIG. 8). Server system 1102 may include a processor 1105 for executing instructions. Instructions may be stored in a memory area 1110, for example. Processor 1105 may include one or more processing units (e.g., in a multi-core configuration).

Processor 1105 may be operatively coupled to a communication interface 1115 such that server system 1102 may be capable of communicating with a remote device such as user computing device 830 (shown in FIG. 8) or another server system 1102. For example, communication interface 1115 may receive requests from user computing device 830 via a network 850 (shown in FIG. 8).

Processor 1105 may also be operatively coupled to a storage device 1110. Storage device 1110 may be any computer-operated hardware suitable for storing and/or retrieving data. In some aspects, storage device 1110 may be integrated in server system 1102. For example, server system 1102 may include one or more hard disk drives as storage device 1110. In other aspects, storage device 1110 may be external to server system 1102 and may be accessed by a plurality of server systems 1102. For example, storage device 1110 may include multiple storage units such as hard disks or solid state disks in a redundant array of inexpensive disks (RAID) configuration. Storage device 1110 may include a storage area network (SAN) and/or a network attached storage (NAS) system.

In some aspects, processor 1105 may be operatively coupled to storage device 1110 via a storage interface 1120. Storage interface 1120 may be any component capable of providing processor 1105 with access to storage device 1110. Storage interface 1120 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1105 with access to storage device 1110.

Memory areas 1010 (shown in FIG. 10) and 1110 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

The computer systems and computer-implemented methods discussed herein may include additional, less, or alternate actions and/or functionalities, including those discussed elsewhere herein. The computer systems may include or be implemented via computer-executable instructions stored on non-transitory computer-readable media. The methods may be implemented via one or more local or remote processors, transceivers, servers, and/or sensors (such as processors, transceivers, servers, and/or sensors mounted on vehicle or mobile devices, or associated with smart infrastructure or remote servers), and/or via computer executable instructions stored on non-transitory computer-readable media or medium.

As will be appreciated based upon the foregoing specification, the above-described aspects of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed aspects of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one aspect, a computer program is provided, and the program is embodied on a computer readable medium. In one aspect, the system is executed on a single computer system, without requiring a connection to a sever computer. In a further aspect, the system is being run in a Windows® environment (Windows is a registered trademark of Microsoft Corporation, Redmond, Washington). In yet another aspect, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some aspects, the system includes multiple components distributed among a plurality of computing devices. One or more components may be in the form of computer-executable instructions embodied in a computer-readable medium. The systems and processes are not limited to the specific aspects described herein. In addition, components of each system and each process can be practiced independent and separate from other components and processes described herein. Each component and process can also be used in combination with other assembly packages and processes. The present aspects may enhance the functionality and functioning of computers and/or computer systems.

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein. The recitation of discrete values is understood to include ranges between each value.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

Any publications, patents, patent applications, and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present disclosure.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples.

What is claimed is:

1. A sensor, comprising:
   an optical whispering gallery mode resonator for sensing acoustic signals;
   a coupling waveguide for optically coupling to the resonator, the coupling waveguide being spaced from the resonator by a separation gap; and
   a polymer encasing a portion of the coupling waveguide and the resonator and filling the separation gap, the polymer having a dimension engineered to enhance acoustic focus on the optical whispering gallery mode resonator, wherein the dimension engineered to enhance acoustic focus on the optical whispering gallery mode resonator comprises an upper boundary of the polymer being a convex upper boundary;
   wherein the resonator and the coupling waveguide each have higher refractive indices than a refractive index of the polymer, and the separation gap is sized such that the sensor r is configured to operate at critical coupling of the resonator and the coupling waveguide or at a maximum loading factor with the polymer filling the separation gap.

2. The sensor of claim 1, wherein the resonator comprises a diameter between about 50 µm and about 200 µm.

3. The sensor of claim 1, wherein the separation gap is between about 0.6 µm and about 0.8 µm.

4. The sensor of claim 1, wherein the separation gap is sized to result in a maximum loading factor during operation of the sensor.

5. The sensor of claim 1, wherein the coupling waveguide is a tapered optic fiber with a minimum taper diameter of less than about 1.5 µm.

6. The sensor of claim 1, wherein the polymer is a UV-curable polymer with a refractive index of 1.33.

7. The sensor of claim 1, wherein the dimension engineered to enhance acoustic focus on the optical whispering gallery mode resonator further comprises a thickness of the polymer being ($\frac{1}{4}+n/2$) times of acoustic center wavelength, where n is an integer.

8. An acoustic sensing system comprising:
   an optical whispering gallery mode resonator for sensing acoustic signals;
   a coupling waveguide for optically coupling to the resonator, the coupling waveguide having a first end and a second end opposite the first end, the coupling waveguide being spaced from resonator by a separation gap; and
   a polymer encasing the resonator and a portion of the coupling waveguide and filling the separation gap, the polymer having a dimension engineered to enhance acoustic focus on the optical whispering gallery mode resonator, wherein the first end of the coupling waveguide and the second end of the coupling waveguide project from the polymer, and the dimension engineered to enhance acoustic focus on the optical whispering gallery mode resonator comprises an upper boundary of the polymer being a convex upper boundary;
   a light source coupled to the first end of the coupling waveguide; and
   a light detector coupled to the second end of the coupling waveguide;
   wherein the resonator and the coupling waveguide each have higher refractive indices than a refractive index of the polymer, and the separation gap is sized such that the acoustic sensing system is configured to operate at critical coupling of the resonator and the coupling waveguide or at a maximum loading factor with the polymer filling the separation gap.

9. The acoustic sensing system of claim 8, further comprising a driving system having a computing device with a processor, the driving system being operatively coupled to the light source and the light detector, wherein the driving system is configured to:
   obtain a transmission spectrum by operating the light source at a range of wavelengths and receiving a plurality of detector signals from the light detector, wherein the detector signals encode a transmission of light from the light source through the coupling fiber coupled to the resonator;
   select an operating wavelength for detecting pressure fluctuations based on the transmission spectrum; and
   detect pressure fluctuations by operating the light source at the operating wavelength and receiving an additional plurality of detector signals from the light detector.

10. The acoustic sensing system of claim 8, wherein the dimension engineered to enhance acoustic focus on the optical whispering gallery mode resonator further comprises a thickness of the polymer being ($\frac{1}{4}+n/2$) times of acoustic center wavelength, where n is an integer.

11. An ultrasound imaging device, comprising:
   an acoustic sensor comprising:
      an optical whispering gallery mode resonator for sensing acoustic signals;
      a coupling waveguide for optically coupling to the resonator, the coupling waveguide having a first end and a second end opposite the first end, the coupling waveguide being spaced from the resonator by a separation gap;
      a polymer encasing the resonator and a portion of the coupling waveguide and filling the separation gap, the polymer having a dimension engineered to enhance acoustic focus on the optical whispering gallery mode resonator, wherein the first end of the coupling waveguide and the second end of the coupling waveguide project from the polymer, and the dimension engineered to enhance acoustic focus on the optical whispering gallery mode resonator comprises an upper boundary of the polymer being a convex upper boundary;

a light source coupled to the first end of the coupling waveguide; and a light detector coupled to the second end of the coupling waveguide;

wherein the resonator and the coupling waveguide each have higher refractive indices than a refractive index of the polymer, and the separation gap is sized such that the acoustic sensor is configured to operate at critical coupling of the resonator and the coupling waveguide or at a maximum loading factor with the polymer filling the separation gap.

12. The ultrasound imaging device of claim 11, wherein the acoustic sensor is configured to detect ultrasound pulses generated within a region of interest in response to excitatory ultrasound pulses directed into the region of interest by an ultrasound transducer.

13. The ultrasound imaging device of claim 11, wherein the dimension engineered to enhance acoustic focus on the optical whispering gallery mode resonator further comprises a thickness of the polymer being ($\frac{1}{4}$+n/2) times of acoustic center wavelength, where n is an integer.

14. A photoacoustic imaging device, comprising:
an acoustic sensor comprising:
an optical whispering gallery mode resonator for sensing acoustic signals;
a coupling waveguide for optically coupling to the resonator, the coupling waveguide having a first end and a second end opposite the first end, the coupling waveguide being spaced from the resonator by a separation gap;
a polymer encasing the resonator and a portion of the coupling waveguide and filling the separation gap, the polymer having a dimension engineered to enhance acoustic focus on the optical whispering gallery mode resonator, wherein the first end of the coupling waveguide and the second end of the coupling waveguide project from the polymer, and the dimension engineered to enhance acoustic focus on the optical whispering gallery mode resonator comprises an upper boundary of the polymer being a convex upper boundary;
a transducer light source coupled to the first end of the coupling waveguide;
a transducer light detector coupled to the second end of the coupling waveguide; and
a photoacoustic light source;
wherein the resonator and the coupling waveguide each have higher refractive indices than a refractive index of the polymer, and the separation gap is sized such that the acoustic sensor is configured to operate at critical coupling of the resonator and the coupling waveguide or at a maximum loading factor with the polymer filling the separation gap.

15. The photoacoustic imaging device of claim 14, wherein the acoustic sensor is configured to detect photoacoustic signals generated within a region of interest in response to illumination by laser pulses produced by the photoacoustic light source.

16. The photoacoustic imaging device of claim 14, wherein the dimension engineered to enhance acoustic focus on the optical whispering gallery mode resonator further comprises a thickness of the polymer being ($\frac{1}{4}$+n/2) times of acoustic center wavelength, where n is an integer.

17. A method for detecting ultrasound waves, the method comprising:
providing an acoustic sensing system, comprising:
an optical whispering gallery mode resonator;
a coupling waveguide for optically coupling to the resonator, the coupling waveguide having a first end and a second end opposite the first end, the coupling waveguide being spaced from the resonator by a separation gap; and
a polymer encasing the resonator and a portion of the coupling waveguide and filling the separation gap, the polymer having a dimension engineered to enhance acoustic focus on the optical whispering gallery mode resonator, the polymer further forming a sample contact surface, wherein the first end of the coupling waveguide and the second end of the coupling waveguide project from the polymer, and the dimension engineered to enhance acoustic focus on the optical whispering gallery mode resonator comprises an upper boundary of the polymer being a convex upper boundary;
a light source for coupling to the first end of the coupling waveguide; and
a light detector for coupling to the second end of the coupling waveguide;
wherein the resonator each have higher and the coupling waveguide refractive indices than a refractive index of the polymer, and the separation gap is sized such that the acoustic sensor is configured to operate at critical coupling of the resonator and the coupling waveguide or at a maximum loading factor with the polymer filling the separation gap;
acoustically coupling the sample contact surface with a sample such that ultrasound waves emitting from within the sample are conducted through the polymer to the resonator and the portion of the coupling waveguide;
introducing light produced by the light source into the first end of the coupling waveguide;
converting light from the second end of the coupling waveguide detected by the light detector into detector signals encoding the amplitude of the detected light; and
transforming the detector signals into a pressure using a predetermined calibration rule.

18. The method of claim 17, wherein the dimension engineered to enhance acoustic focus on the optical whispering gallery mode resonator further comprises a thickness of the polymer being ($\frac{1}{4}$+n/2) times of acoustic center wavelength, where n is an integer.

* * * * *